(12) United States Patent
Yusa et al.

(10) Patent No.: US 8,404,163 B2
(45) Date of Patent: Mar. 26, 2013

(54) METHOD FOR PRODUCING MOLDED ARTICLE

(75) Inventors: Atsushi Yusa, Ibaraki (JP); Tetsuya Ano, Ibaraki (JP); Satoshi Yamamoto, Ibaraki (JP); Toshiyuki Ogano, Ibaraki (JP)

(73) Assignee: Hitachi Maxwell, Ltd., Ibaraki-Shi, Osaka (JP)

( * ) Notice: Subject to any disclaimer, the term of this patent is extended or adjusted under 35 U.S.C. 154(b) by 125 days.

(21) Appl. No.: 12/997,194

(22) PCT Filed: Jun. 9, 2009

(86) PCT No.: PCT/JP2009/060528
§ 371 (c)(1),
(2), (4) Date: Dec. 9, 2010

(87) PCT Pub. No.: WO2009/151052
PCT Pub. Date: Dec. 17, 2009

(65) Prior Publication Data
US 2011/0104380 A1    May 5, 2011

(30) Foreign Application Priority Data
Jun. 10, 2008    (JP) .................................. 2008-151916

(51) Int. Cl.
*C04B 40/00* (2006.01)
(52) U.S. Cl. ........................................................ 264/82
(58) Field of Classification Search ...................... 264/82
See application file for complete search history.

(56) References Cited

U.S. PATENT DOCUMENTS

| | | | |
|---|---|---|---|
| 6,726,862 B2 | 4/2004 | Teraoka et al. | |
| 2001/0008316 A1* | 7/2001 | Teraoka et al. | 264/50 |
| 2007/0190310 A1 | 8/2007 | Yusa et al. | |
| 2007/0264451 A1 | 11/2007 | Yusa et al. | |

FOREIGN PATENT DOCUMENTS

| | | |
|---|---|---|
| JP | 2001-138371 A | 5/2001 |
| JP | 2003-292629 A | 10/2003 |
| JP | 2005-280362 A | 10/2005 |
| JP | 2007-76374 A | 3/2007 |
| JP | 2007-84929 A | 4/2007 |
| JP | 2007-131725 A | 5/2007 |
| JP | 2007-301828 A | 11/2007 |

OTHER PUBLICATIONS

International Search Report, dated Jul. 7, 2009, issued in PCT/JP2009/060528.
Taro Hori, "Latest Applied Technology for Supercritical Fluid," pp. 250-255, published in 2004 by NTS Inc.
Machine translation of JP 2007-301828-A.

* cited by examiner

*Primary Examiner* — Larry Thrower
(74) *Attorney, Agent, or Firm* — Birch, Stewart, Kolasch & Birch, LLP

(57) ABSTRACT

The present invention provides a method for producing a molded article which enables dissolution of a desired amount of a subject material in a molten resin without any limitation by the solubility of a high-pressure carbon dioxide in the molten resin and which is therefore suitable for commercial production of molded articles. The present invention pertains to a method for producing a molded article by molding a molten resin, and this method is characterized by including steps of supplying a high-pressure carbon dioxide and a subject material dissolved therein, into the molten resin; kneading the molten resin into which the high-pressure carbon dioxide and the subject material have been supplied; and exhausting the high-pressure carbon dioxide from the kneaded molten resin.

13 Claims, 4 Drawing Sheets

METHOD FOR PRODUCING MOLDED ARTICLE

TECHNICAL FIELD

The present patent application claims the Convention priority based on Japanese Patent Application No. 2008-151916, and the entire contents thereof are incorporated in the present specification by reference thereto. The present invention relates to a method for producing a molded article. Particularly, the present invention pertains to a method for producing a molded article with the use of a high-pressure carbon dioxide such as a supercritical carbon dioxide so as to modify a molded article shaped of a resin such as a thermoplastic resin or the like, which method is suitable for use in commercial production or mass production of molded articles.

BACKGROUND OF THE INVENTION

Recently, the technologies utilizing supercritical fluids such as a supercritical carbon dioxide, etc. as solvents have been vigorously researched. A supercritical fluid shows a surface tension of zero, and thus can have a diffusivity comparable to gases, and this fluid has a density close to that of liquids and thus can be used as a solvent. As one of the technologies utilizing the physical properties of supercritical fluids, electroless plating of plastics with the use of supercritical fluids is proposed (cf. Non-Patent Publication 1). The electroless plating method with the use of a supercritical fluid is effective to overcome the problems which the conventional electroless plating methods for plastics have confronted.

The electroless plating methods have come into wide use as means for forming electrically conductive metal films on the surfaces of plastic structural bodies for electronic devices. In general, a conventional plastic electroless plating process comprises a resin-molding step, a molded article-degreasing step, an etching step, a neutralizing- and wetting-step, a catalyst-adding step, a catalytic activation step, and an electroless plating step, while this process has some difference depending on the kinds of materials, etc. Roughening of the surface of a plastic molded article in the etching step is effective to improve the adhesion of a plating film formed in the subsequent electroless plating step.

In the etching process, a solution of chromic acid or a solution of alkali metal hydroxide is used as an etchant. A post-treatment such as neutralization of this etchant is needed before the waste thereof. This post-treatment is one of factors to increase the production cost. Again, the etchant for use in the etching step is highly hazardous, and thus, careful attentions should be paid to handling of such an etchant. In the European, RoHS (Restriction of the use of certain Hazardous Substances in electrical and electric equipment) has been constituted. Material manufacturers and component suppliers have been performed the duty to guarantee that no chromium (VI) or the like shall be contained in electric and electronic devices newly put on the European markets, on and after Jul. 1, 2006. Under such a situation, the conventional plastic electroless plating process with the use of an etchant has been required to be shifted to an alternate process therefor.

Non-Patent Publication 1 discloses one method for forming a plating film with sufficient adhesion on a plastic molded article, without the use of any etchant. According to this method of Non-Patent Publication 1, firstly, an organic metal complex is dissolved in a supercritical carbon dioxide, and the supercritical carbon dioxide having the metal complex dissolved therein is brought into contact with a variety of polymer molded articles, so that the organic metal complex is allowed to penetrate the polymer molded articles. Then, the organic metal complex is reduced by a heat treatment or chemical reduction treatment. As a result, fine metal particles precipitate on the polymer molded article, so that electroless plating of the polymer molded article becomes possible by using the fine metal particles as catalytic nuclei. Any treatment of the waste is not needed in the electroless plating process employing the method of Non-Patent Publication 1 because of no use of an echant. In addition, roughening of the surface of the polymer molded article with an echant is not needed, so that the molded article is low in surface roughness and thus is in a good condition.

In the meantime, the present inventors have proposed a new method different from the method of Non-Patent Publication 1, as the electroless plating method without using any etchant (Patent Publication 1). According to the method of Patent Publication 1, fine metal particles of a metal complex or the like are charged in a high-pressure vessel and are dissolved in a supercritical carbon dioxide; this supercritical carbon dioxide is dissolved at the flow-front portion of a thermoplastic cylinder; and a molten resin is injected from this thermoplastic cylinder for molding of the molten resin. By dissolving the metal complex or the like in the resin before the molding, it becomes possible to segregate the fine metal particles as catalytic nuclei for electroless plating, on the surface portion of the molded article (or in the proximity of the surface of the molded article).

The electroless plating process using the supercritical fluid described in the above Non-Patent Publication 1 is a batch process which comprises a step of molding, a step of allowing the organic metal complex to penetrate the molded article, and a step of electroless plating on the molded article in this order. In the organic metal complex penetration step, the molded article and carbon dioxide are needed to be heated and pressurized up to a supercritical state, and after the penetration treatment, the molded article and the carbon dioxide are needed to be again lowered to ordinary temperature and pressure. Therefore, a certain time is required for this heat-pressurizing treatment and the treatment of lowering to the ordinary temperature and pressure. In case where the organic metal complex penetration step of Non-Patent Publication 1 is employed instead of the etching step, it is considered to be very difficult to achieve a high continuous productivity (mass productivity). Particularly in case of production of a large molded article, a high-pressure vessel for use in heating and pressurizing is increased in size, so that the amounts of carbon dioxide and the molded article to be heated and pressurized are increased accordingly. Consequently, decrease in continuous productivity is more remarkable. Besides, there arises another disadvantage when the organic metal complex penetration step of Non-Patent Publication 1 is employed: that is, the supercritical carbon dioxide, etc. tend to soften the surface of the polymer molded article, and the supercritical fluid and the metal complex are allowed to penetrate the softened polymer molded article, with the result that the molded article deforms because of the softening thereof, which makes it hard to maintain and ensure the precision in the external shape and configuration of the molded article.

In contrast, in the molding method of Patent Publication 1, it is possible to carry out the electroless plating process on the molded article subsequent to the resin-molding step. Accordingly, it becomes possible to omit the necessary steps of the conventional process, i.e., the molded article-degreasing step, the etching step, the neutralization- and wetting-step, the catalyst-adding step and the catalyst-activation step. The electroless plating process, therefore, can be greatly simplified. Since the molding method of Patent Publication 1 is free from any problem in continuous productivity (or mass productivity) which Non-Patent Publication 1 suffers from, the electroless plating process for plastics by the molding method of Patent Publication 1 is optimal as an alternate process for commercial production or mass production.

PRIOR ART LITERATURE

Patent Publications

Patent Publication 1: JP-A-2005-280362
Patent Publication 2: JP-A-2003-292629

Non-Patent Publication

Non-Patent Publication 1: Latest Applied Technology for Supercritical Fluid (by Teruo Hori, pp 250-255, published in 2004 by NTS Inc.)

SUMMARY OF THE INVENTION

Problems to be Solved by the Invention

However, the present inventors have found that even the method of Patent Publication 1 confronts the following problem in mass production, as they went on their intensive studies. That is, in the commercial production or mass production, it is likely to be impossible to appropriately control the amount of a subject material to be dissolved in a resin (i.e., a penetrating material) so as to obtain a modifying effect in accordance with an end use of the resultant molded article.

A molded articles is required to have various properties such as adhesion to a plating film, wetting ability at its surface and strength. Patent Publication 1 discloses that desired properties are obtained by dissolving subject materials in a resin before molding. Therefore, it is needed to dissolve such subject materials in amounts suitable for the required properties.

Again, in the method of Patent Publication 1, a supercritical carbon dioxide is used to dissolve subject materials in the resin before molding. A supercritical carbon dioxide has a limit in solubility to a resin, as well as, for example, a subject material to be dissolved, such as a metal complex. The solubility of a polycarbonate resin in a supercritical carbon dioxide is about 10% by weight. As will be described later, at most about 30 g/L (liter) of a metal complex can be dissolved in a high-pressure carbon dioxide (15 MPa at 400° C.), and thus, at most about 0.4% by weight of the metal complex is dissolved in a polycarbonate resin. When a larger amount of the metal complex than the above amount is needed to modify a molded article, such a larger amount of the metal complex can not be dissolved by the method of Patent Publication 1. For example, in order to markedly modify the surface properties of a molded article, it is needed to dissolve a large amount of a silicone oil or the like in a molten resin by using a supercritical carbon dioxide, which is however impossible in the method disclosed in Patent Publication 1. That is, the amount of a subject material to be dissolved in a resin by using carbon dioxide is limited, because the amount of carbon dioxide possible to be dissolved in a molten resin is limited. Particularly, in case where a subject material maintained in a dissolved state in a high-pressure carbon dioxide is stably supplied into a molten resin, it is desirable that the subject material should be dissolved in the high-pressure carbon dioxide at an unsaturation concentration but not a saturation concentration. However, as a result of the decrease in the concentration of the subject material in the high-pressure carbon dioxide as above, the amount of the subject material to be dissolved in the resin by using the carbon dioxide is further limited. On the other hand, when the subject material is introduced at a saturation solubility, there arises a problem that the subject material tends to precipitate due to a change in temperature, etc.

The present invention is developed to solve the foregoing problems. An object of the present invention is therefore to provide a method for producing a molded article, suitable for commercial production, whereby, it becomes possible to dissolve a desired amount of a subject material in a molten resin without any limitation by the solubility of a high-pressure carbon dioxide in the molten resin.

Means for Solving the Problems

The present invention provides a method for producing a molded article by molding a molten resin, characterized in that the method includes a step of supplying a high-pressure carbon dioxide and a subject material dissolved in the high-pressure carbon dioxide into the molten resin; a step of kneading the molten resin into which the high-pressure carbon dioxide and the subject material have been supplied; and a step of exhausting the high-pressure carbon dioxide from the kneaded molten resin. In the present invention, a higher concentration of the high-pressure carbon dioxide than a saturation solubility thereof to the molten resin can be supplied into the molten resin, particularly by concurrently or sequentially carrying out the steps of exhausting the high-pressure carbon dioxide from the kneaded molten resin, and supplying a high-pressure carbon dioxide and the subject material dissolved therein into the molten resin.

In the present invention, the high-pressure carbon dioxide and the subject material may be further supplied while the high-pressure carbon dioxide being exhausted from the kneaded molten resin. Accordingly, it becomes possible to increase the concentration of the subject material in the kneaded molten resin, while controlling the concentration of the high-pressure carbon dioxide in the molten resin. Therefore, a desired amount of the subject material can be supplied into the molten resin without any limitation by the solubility of the high-pressure carbon dioxide in the molten resin.

MODES FOR CARRYING OUT THE INVENTION

Figure 1:
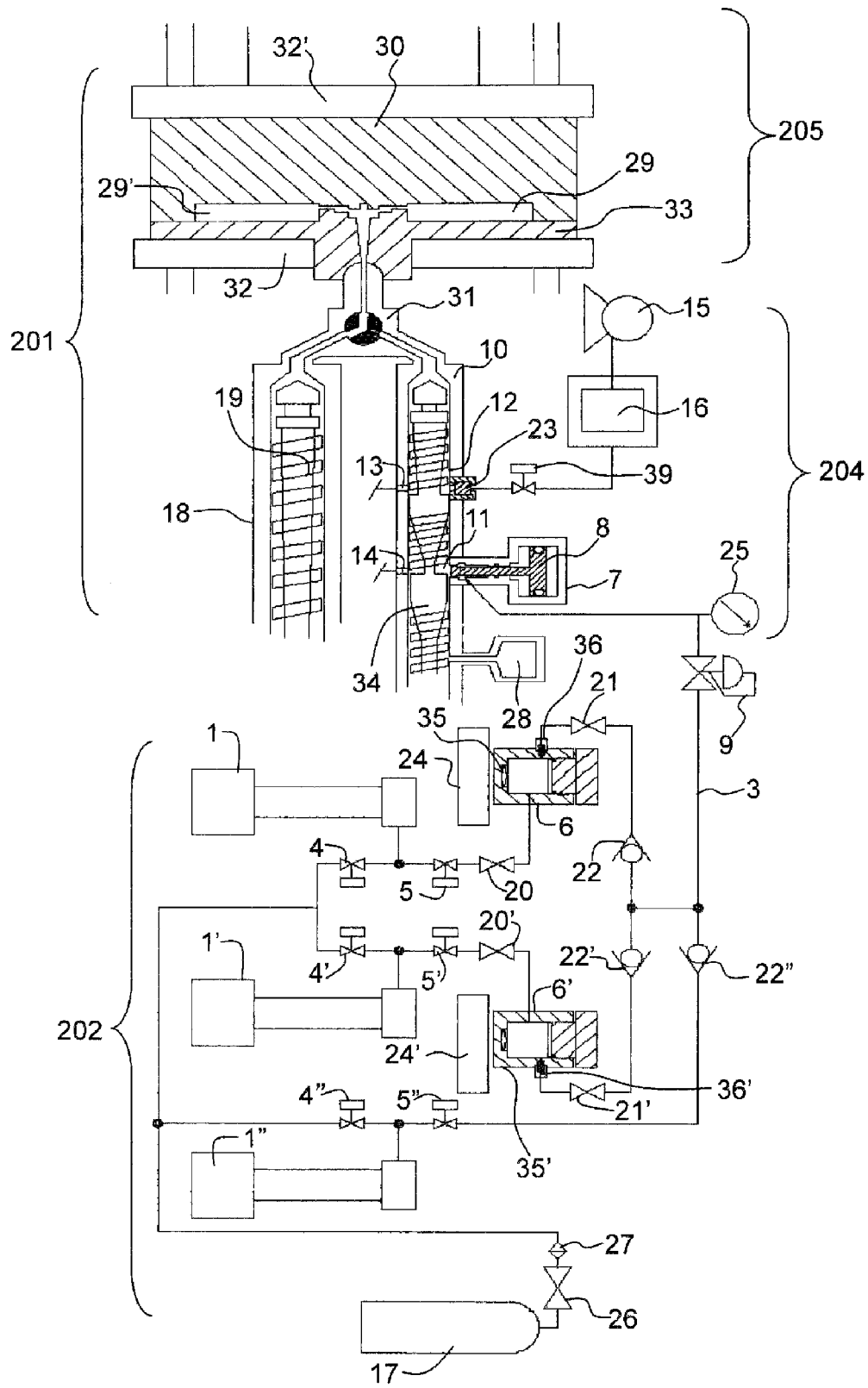
FIG. 1 shows a schematic diagram of the essential section of the molding apparatus of Example 1.

In the present invention, a metal alkoxide, a silicone oil, a fluorine compound, a reactive monomer, etc. can be used as the subject material to be dissolved. The reactive monomer can be polymerized in a kneaded resin to disperse the resultant polymer in the resin. The reactive monomer may be ϵ-caprolactam, and the polymer may be 6-Nylon.

In the present invention, in the kneading step, a molten resin may be charged in a cylinder equipped with a screw and may be kneaded by rotation of the screw within the cylinder, and the screw may be normally and reversely rotated during, or before or after the supply of a high-pressure carbon dioxide and a subject material dissolved therein into the molten resin.

Measurement of the molten resin with the cylinder is usually made by the normal operation of the screw. Therefore, a time taken for the supply of the high-pressure carbon dioxide, etc. into the molten resin is limited by a measuring time proportional to the amount of the molten resin to be measured. However, such a measuring time is likely to be insufficient, in case where a large amount of a high-pressure carbon dioxide is supplied. To solve this problem, a practical measuring time can be prolonged to be longer than a given measuring time, by normally and reversely rotating the screw, so that a time sufficient to supply desired amounts of the high-pressure carbon dioxide and the subject material into the molten resin can be ensured. As a result, a desired amount of the subject material can be supplied into the molten resin without any limitation by the practical measuring time.

In the present invention, a metal complex which is converted into catalytic nuclei for plating may be dissolved in the high-pressure carbon dioxide, together with the subject material. In this case, the method of the present invention further includes a step of supplying the high-pressure carbon dioxide having the metal complex dissolved therein into the molten resin, and a step of kneading the molten resin into which the high-pressure carbon dioxide and the metal complex have been supplied, before the supply of the high-pressure carbon dioxide and the subject material dissolved therein, into the molten resin, wherein the supply of the high-pressure carbon dioxide and the subject material dissolved therein, into the molten resin may be started after the start of exhaustion of the high-pressure carbon dioxide from the kneaded molten resin. Otherwise, the method of the present invention further includes a step of supplying the high-pressure carbon dioxide having the metal complex and the subject material dissolved therein, into the molten resin, and a step of kneading the molten resin into which the metal complex, the subject material and the high-pressure carbon dioxide have been supplied, before the supply of the high-pressure carbon dioxide and the subject material dissolved therein into the molten resin, wherein the supply of the high-pressure carbon dioxide and the subject material dissolved therein into the molten resin may be started after the start of the exhaustion of the high-pressure carbon dioxide from the kneaded molten resin.

The metal complex to be converted into the catalytic nuclei for plating, generally dissolved a little, sufficiently exhibits its function. For this reason, the required amount of the metal complex to be converted into the catalytic nuclei for plating is different from the required amount of the subject material to be dispersed in a large amount into the resin. According to the above-described two supplying methods each in two steps, it is possible to dissolve optimal amounts of such two different materials which differ in their dissolved amounts from each other, respectively. A time for the two-step supply can be appropriately ensured, particularly by normally and reversely rotating the screw. Again, according to the above-described two supplying methods each in two steps, it is possible to inhibit the metal complex from subliming and exiting from the molten resin, together with the high-pressure carbon dioxide, since the exhaustion of the high-pressure carbon dioxide is started after the kneading of the metal complex with the molten resin.

The above-described method of the present invention further may include a step of molding the molten resin having the high-pressure carbon dioxide and the subject material kneaded therein, to shape a molded article, and a step of forming a metal film on the molded article by electroless plating. Thus, a molded article having a metal film formed thereon can be obtained.

In the present invention, the subject material may be dissolved at an unsaturation concentration in the high-pressure carbon dioxide, when the high-pressure carbon dioxide and the subject material dissolved therein are supplied into the molten resin. The subject material, dissolved at an unsaturation concentration in the high-pressure carbon dioxide is not caused to precipitate on, for example, piping or control valves, in the course of the feeding thereof into the molten resin, even if the temperature or humidity of the high-pressure carbon dioxide changes. Again, in case where the subject material contains the metal complex, the temperature of the high-pressure carbon dioxide before the supply thereof into the molten resin is needed to be maintained at a temperature low enough not to permit thermal conversion of the metal complex. Even in such a case, it is possible to permit no thermal conversion of the metal complex when it is supplied into the molten resin. Since the metal complex is not thermally converted into fine metal particles before it is kneaded with the molten resin, the metal complex can be dispersed in the molten resin. Particularly by normally and reversely rotating the screw, a time spent for the supply of the subject material at an unsaturation concentration can be appropriately ensured.

When the subject material is dissolved at an unsaturation concentration in the high-pressure carbon dioxide, it is important to stabilize the concentration of the subject material. If the concentration of the subject material is instable, the dissolution amounts of the subject material in a plurality of mass-produced molded articles are variable, with the result that mass production of uniform molded articles with stable properties becomes difficult: for example, variation in the concentration of the metal complex leads to variation in the adhesions of plating films to molded articles. In order to stabilize and keep the concentration of the subject material such as the metal complex at an unsaturation concentration, the high-pressure carbon dioxide having the subject material and the metal complex dissolved therein may be supplied into the molten resin, by the following procedure: for example, the subject material and the metal complex are dissolved at such concentrations as to supersaturate in the high-pressure carbon dioxide, to thereby provide a high-pressure carbon dioxide in which the subject material and the metal complex are dissolved at saturation concentrations; then, this high-pressure carbon dioxide in which the subject material and the metal complex are dissolved at saturation concentrations is mixed with another high-pressure carbon dioxide to provide a high-pressure carbon dioxide in which the subject material and the metal complex are dissolved at unsaturation concentrations; and this high-pressure carbon dioxide in which the subject material and the metal complex are dissolved at unsaturation concentrations is supplied into the molten resin.

A mixing ratio of the high-pressure carbon dioxide in which the subject material is saturated, to another high-pressure carbon dioxide containing no subject material, is determined as follows: for example, the pressures of these high-pressure carbon dioxides are controlled to be substantially the same, and then, flow control is made to allow the respective high-pressure carbon dioxides to flow at predetermined flow rates. By doing so, the concentration of the subject material is stabilized at a predetermined unsaturation concentration.

Further, by controlling the mixing ratio of the mixture of the high-pressure carbon dioxide in which the subject material is saturated, with another high-pressure carbon dioxide containing no subject material, the dissolution amount of the subject material supplied into the resin can be controlled to an optional and desired amount (or concentration), independently of the amount of the high-pressure carbon dioxide supplied into the resin. The amount of the subject material can be optimized to a lower limit amount (or concentration) required to modify a molded article. When the amount of the high-pressure carbon dioxide supplied into the resin is too small, diffusion of the subject material in the resin becomes insufficient, even if the subject material is kneaded into the resin after the supply thereof. When the amount of the high-pressure carbon dioxide supplied into the resin is, on the contrary, too large, an excess of the high-pressure carbon dioxide facilitates separation of the subject material from the resin, even if the subject material is kneaded into the resin after the supply thereof, and deformation or foaming of a molded article is more likely to occur because of the excess of the high-pressure carbon dioxide. An optimal range of the supply amount of the high-pressure carbon dioxide is determined in accordance with the volume of a molded article or molding conditions. In this case, the amounts of the high-pressure carbon dioxide and the subject material supplied as a fluid mixture into the resin can be separately controlled to optimal values. Therefore, an optimal amount of the subject material can be well diffused in the resin, while deformation or foaming of the molded article is being inhibited. Further, a larger amount of the subject material than required is not wastefully used, as is the case where the subject material is supplied, for example, at a solubility equivalent to the saturation concentration into the resin. As a result, the cost can be reduced.

The temperature and pressure of the high-pressure carbon dioxide to be used in the present invention may be optionally selected within such ranges that permit dissolution of the subject material. The pressure of the high-pressure carbon dioxide is preferably 7 MPa or higher, more preferably 10 MPa or higher. As the pressure of the high-pressure carbon dioxide becomes higher and higher, it is more possible to increase the dissolution amount of the subject material for its saturation concentration: in other words, the maximal dissolution amount of the subject material that can be dissolved in the high-pressure carbon dioxide can be increased. Again, the pressure of the high-pressure carbon dioxide is desirably 35 MPa or lower, in order to prevent a decrease in the seal stability of a high-pressure vessel or piping. When the pressure of the high-pressure carbon dioxide is 7 MPa or higher, the temperature thereof is desirably 10° C. or higher at which carbon dioxide is formed into a liquid, or the temperature thereof may be 31° C. or higher which is a critical point. In this regard, preferably, the high-pressure carbon dioxide is supplied at a temperature as low as about 10 to about 50° C., at least 100° C. or lower. Within this range of temperatures, the density of the high-pressure carbon dioxide becomes higher until it has been supplied into the resin, so that control of the supply amount thereof is stabilized, and so that the high-pressure carbon dioxide is hard to be subject to an influence of external disturbance.

In case where a plural number of different subject materials are used, each of the different subject materials or each group of the subject materials is allowed to separately saturate in each high-pressure carbon dioxide; and a plurality of high-pressure carbon dioxides in which the respective subject materials are dissolved are mixed with other high-pressure carbon dioxide which does not contain any of the plural number of different subject materials, to thereby form a fluid mixture in which the plural number of different subject materials are dissolved at desired concentrations lower than the solubilities for the respective saturation concentrations.

In this case, the plural number of the different subject materials can be dissolved in the fluid mixture at a predetermined ratio for each desired kind of the subject material or for each desired group of the subject materials. The dissolution amount of each subject material can be individually controlled. While the saturation concentration (or maximum solubility) of each subject material in the high-pressure carbon dioxide is different from one another, it is possible to supply into the resin the fluid mixture in which the plural number of different subject materials with different solubilities are dissolved at an optional ratio. For example, it is possible to supply into the resin a fluid mixture in which a subject material with a low solubility is dissolved in a larger amount than that of a subject material with a high solubility.

In the present invention, for example, a metal alkoxide, a silicone oil, a fluorine compound, a reactive monomer or the like can be used as the subject material. However, the subject material is not limited to these. A dye, a surfactant, an antistatic agent, a hydrophilization material, a hydrophobization material or the like may be used as the subject material.

The metal complex is supplied into the resin and is then converted into fine metal particles, which then precipitate and act as catalytic nuclei for plating in the step of electroless plating. The use of a high-pressure carbon dioxide in electroless plating is effective to grow an electroless plating film from the fine metal particles dispersed in a molded article, so that there is formed the plating film with high adhesion to the molded article.

The metal complex usable in the method of the present invention may be optionally selected. Examples of the metal complex include bis(cyclopentadienyl)nickel, bis(acetylacetonato)palladium (II), dimethyl-(cyclooctadienyl)platinum (II), hexafluoroacetylacetonato-palladium (II), hexafluoroacetylacetonatohydrate copper (II), hexafluoroacetylacetonatoplatinum (II), hexafluoroacetylacetonato(trimethylphosphine)silver (I), dimethyl(heptafluoroctanedionate)silver (AgFOD), etc. Preferably, there is used a fluorine-containing metal complex which shows a markedly high solubility in a high-pressure carbon dioxide, for example, hexafluoroacetylacetonatopalladium (II).

In the production method of the present invention, there may be used an assistant (one of the subject materials to be dissolved in a high-pressure carbon dioxide) so as to improve a surface segregation property of the metal complex. As a result of the present inventors' researches, the following properties have been found in the fluorine-containing metal complex: the fluorine-containing metal complex having a low thermal decomposition temperature (its thermal decomposition-starting temperature in an air or a nitrogen atmosphere: about 70° C.) decomposes immediately after supplied into a resin with a high temperature, and therefore, when supplied into a heated and molten resin, the fluorine-containing metal complex becomes insoluble in a high-pressure carbon dioxide before dispersed in the resin. Such an insolublized fluorine-containing metal complex is hard to segregate on the proximity of the surface of a molded article, and is buried into the molded resin, instead. To suppress occurrence of this phenomenon, it is effective to add a certain fluorine compound. For example, it is effective to add a variety of fluoropolyalkylene glycols, carboxylate perfluoropolyether (the chemical structural formula: $F-(CF_2CF(CF_3)O)_n-CF_2CF_2COOH$ (Krytox® manufactured by Dupont)), ammonium perfluoropolyethercarboxylate (C24O4, an ammonium salt manufactured by DAIKIN INDUSTRIES, LTD.), perfluoroanakylanologue of sulfasuccinate (AOT), a surfactant having a perfluoropolyether (PFPE) group, or the like. Any of these additives is a compound which has a boiling point of from 150 to 200° C. or higher and 400° C. or lower and has a molecular weight of 500 or more and 2,000 or less and which is soluble in a high-pressure carbon dioxide. It is considered that, by adding such a fluorine compound, this compound surrounds the fluorine-containing metal complex and acts like a solvent, to thereby protect the metal complex exposed to a high temperature during an operation for injection molding or the like. Thus, the metal complex can maintain the form of a complex under a high temperature atmosphere. Any of these compounds contains a fluorine atom, and therefore is low in its surface energy and is easy to bleed out to the surface of a molded article during the molding operation.

In this regard, some of these assistants may be used in combination. In the high-pressure carbon dioxide-supplying method of the present invention, many kinds of subject materials can be dissolved in optional addition amounts (dissolution amounts) in a high-pressure carbon dioxide, independently of the respective solubilities; and the subject materials dissolved in the high-pressure carbon dioxide are supplied. In other words, the metal complex which has a high solubility and may be smaller in supply amount, and the assistant which likewise has a high solubility and is larger in supply amount can be supplied in their respective optimal addition amounts, concurrently at once as a fluid mixture (in a high-pressure carbon dioxide) into the resin.

Again, in the present invention, as the assistant for the metal complex, a silicone oil which has a high resistance and is soluble in a high-pressure carbon dioxide may be used. Otherwise, the silicone oil alone may be singly used. The silicone oil is supplied into a plasticizing cylinder and is then supplied into the resin and dispersed in the molten resin with a high temperature, and is then dispersed in the surface of a molded article or in the proximity of the surface thereof by way of injection molding of such a molten resin. When this molded article is brought into contact with a high-pressure carbon dioxide, it is possible to extract the silicone oil from the molded article. By this extraction of the silicone oil, fine pores can be formed on (the surface of) the molded article. After that, this molded article is brought into contact with an electroless plating solution, so that the electroless plating solution can efficiently penetrate the inner portion of the molded article through lots of the fine pores. Consequently, the resultant plating film can have higher adhesion to the molded article than that of a molded article on which plating catalytic nuclei (or fine metal particles) alone are diffused.

The silicone oil usable in the present invention may be optionally selected. There may be used a silicone oil which has an end group modified by a polar group such as a hydroxyl group, amine group, epoxy group or the like. The molecular weight of the silicone oil is preferably from about 200 to about 2,000. When the molecular weight is smaller than 200, such a silicone oil is hard to be extracted from the surface of a molded article, with the result that a sufficient amount of fine pores can not be formed. On the contrary, when the molecular weight is larger than 2,000, such a silicone oil becomes insoluble in a high-pressure carbon dioxide and thus is hard to segregate on the surface of a molded article, with the result that a sufficient amount of fine pores can not be formed.

In the present invention, a metal alkoxide (i.e., a kind of the subject materials to be dissolved in a high-pressure carbon dioxide) may be used as a subject material to be dissolved in a high-pressure carbon dioxide together with the metal complex; or, the metal alkoxide alone may be singly used. Examples of the metal alkoxide include $Al(O\text{-}i\text{-}C_3H_7)_3$, $Ba(OC_2H_5)_2$, $B(OCH_3)_3$, $B(OC_2H_5)_3$, $Bi(O\text{-}t\text{-}C_5H_{11})_3$, $Ca(OC_2H_5)_2$, $Fe(O\text{-}i\text{-}C_3H_7)_3$, $In(O\text{-}i\text{-}C_3H_7)_3$, $KOC_2H_5$, $La(O\text{-}i\text{-}C_3H_7)_3$, $LiOCH_3$, $Mg(OC_2H_5)_2$, $NaOC_2H_5$, $Nb(OC_2H_5)_5$, $PO(OC_2H_5)_3$, $P(OCH_3)_3$, $Si(OC_2H_5)_4$(TEOS), $Sn(O\text{-}i\text{-}C_3H_7)_4$, $Ta(OC_2H_5)_5$, $Ti(O\text{-}i\text{-}C_3H_7)_4$, $Zr(O\text{-}i\text{-}C_3H_7)_4$, etc. It is particularly preferable to use tetraethoxysilane (TEOS) which is a precursor of silicon dioxide having a high solubility in a high-pressure carbon dioxide. When a proper amount of tetraethoxysilane is dispersed in a resin, tetraethoxysilane reacts with a very small amount of water in the resin and is converted into silicon dioxide. Again, when silicon dioxide or tetraethoxysilane segregates on the surface of a molded article, the surface wettability of the molded article is improved, so that the adhesion of the resultant plating film is improved.

The method for producing a molded article according to the present invention can be applied to various existing molding processes with the use of molten resins, for example, the injection molding process, the extrusion molding process, the compression molding process, etc. In the injection molding process, supply of a high-pressure carbon dioxide and a subject material into a plasticized and molten resin may be done by any of the flow-front method, the core back method and the screw kneading method. The flow-front method is carried out as follows: a high-pressure carbon dioxide and a subject material are supplied into a resin plasticized and molten in a heating cylinder (e.g., the flow-front portion at the tip end portion thereof) and in a suction-back state after the measurement thereof, and then, the resulting molten resin is injected into a die. The core back method is carried out as follows: a clearance is formed in a die filled with an injected molten resin, and a high-pressure carbon dioxide and a subject material are supplied into the interface (i.e., the clearance) between the molten resin and the die. The screw kneading method is based on sandwich molding or two-color molding: that is, a high-pressure carbon dioxide and a subject material are supplied into one of a plurality of heating cylinders and are further kneaded with a molten resin; and this kneaded resin is used to form a part such as a surface skin of a molded resin, and the rest portions of the molded article are shaped of molten resins in other heating cylinders. In the extrusion molding process, the screw kneading method can be employed.

The molten resin into which the fluid mixture is supplied may be heated and molten at a temperature higher than that of the fluid mixture. In case where the resin is heated and molten at a temperature higher than that of the fluid mixture, the high-pressure carbon dioxide is heated and expanded when the high-pressure carbon dioxide and the subject material are supplied into this molten resin. When the high-pressure carbon dioxide is expanded, the maximal amount (or the dissolution amount at a saturation concentration) of the subject material soluble in the high-pressure carbon dioxide is decreased, and thus, the subject material supersaturates and precipitates. The subject material which precipitates as above when it is supplied tends to collect at one site and therefore is hard to be diffused into the molten resin, even if the molten resin is kneaded thereafter. When the subject material is a metal complex, the metal complex, which has once precipitated, is converted into fine metal particles, increasing in its weight, and thus is hard to be diffused into the molten resin, even if the molten resin is kneaded. In the present invention, the dissolution amount of the subject material in the molten is equivalent to an unsaturation concentration, so that such an amount of the subject material does not precipitate when supplied into the resin, and is sufficiently diffused into the molten resin when the molten resin is kneaded thereafter.

When the subject material contains a metal complex, the molten resin into which the fluid mixture is supplied may be heated and molten at a temperature higher than the thermal conversion temperature of the metal complex. The metal complex is usually converted into fine metal particles when heated to a temperature higher than its thermal conversion temperature. However, the metal complex in a mixed state with a high-pressure carbon dioxide is not converted into fine metal particles, even if the metal complex is heated to a temperature higher than its thermal conversion temperature. It is considered that this may be because the high-pressure carbon dioxide encloses the metal complex, so that the metal complex can not bind to another metal complex, even if the metal complex is heated to such a temperature higher than its thermal conversion temperature that allows it to bind to another metal complex. Since the metal complex is not thermally converted into fine metal particles, the use of the metal complex having a solubility equivalent to an unsaturation concentration in combination with the high-pressure carbon dioxide makes it possible to sufficiently disperse, in the molten resin, fine metal particles which will act as plating catalytic nuclei later. Particularly when the mixing ratio of the high-pressure carbon dioxide in which the metal complex saturates, to other high-pressure carbon dioxide is adjusted to 1:0.5 to 1:20, this effect can be expected. When the proportion of the high-pressure carbon dioxide in which the metal complex saturates is smaller than 1:20, the catalyst concentration is too low, and therefore, failure in adhesion is likely to occur in the resulting plating film. On the contrary, when the proportion of the high-pressure carbon dioxide in which the metal complex saturates is larger than 1:0.5, the metal complex is likely to precipitate when brought into contact with the resin with a high temperature.

For example, a high-pressure carbon dioxide in which the metal complex saturates, a high-pressure carbon dioxide in which the assistant saturates, and other high-pressure carbon dioxide which contains no metal complex or assistant are mixed. In this case, the above-described other high-pressure carbon dioxide which contains no metal complex includes the high-pressure carbon dioxide in which the assistant saturates and other high-pressure carbon dioxide which contains no metal complex or assistant.

The method of the present invention is suitable for use in commercial production, because a desired amount of a subject material can be dissolved in a molten resin without any limitation by the solubility of a high-pressure carbon dioxide in the molten resin.

Hereinafter, the method for producing a molded article, according to each Example of the present invention will be described with reference to the accompanying drawings. However, the scope of the present invention is not limited to the following Examples in any way.

EXAMPLE 1

In Example 1, a sandwich injection molding apparatus which had two plasticizing cylinders 10 and 18 and which separately injected a molten resin to form a surface skin and an inner skin of a molded article with the respective screws 34 and 14 was used to shape a molded article by injection molding. Firstly, a high-pressure carbon dioxide in which a metal complex and an assistant (a fluorine compound) were dissolved at solubilities lower than those equivalent to their respective saturation concentrations was supplied into the plasticizing cylinder 10 for use in formation of a surface skin (i.e., a surface skin portion of the molded article) in the sandwich injection molding apparatus; a molten resin in the cylinder was injected into the dies 30 and 33 to segregate fine metal particles as catalytic nuclei for plating, on the surface portions of thermoplastic resins in the dies 30 and 33 (i.e., the surface skin portion or the inner portion beneath the outermost surface portions of the surface skin portion (the inner portions)). After that, a resin having no high-pressure carbon dioxide supplied thereinto was injected from the plasticizing cylinder 18 to form an inner skin (or an inner portion of the molded article). In this way, there was obtained a sandwich molded article in which a penetrating substance (i.e., the subject material) such as a metal catalyst was allowed to penetrate only the outer portion (i.e., the surface skin portion, or the inner portion beneath the outermost surface portion of the surface skin portion) of the surface skin.

In Example 1, a plating film was further formed on the surface of this molded article by electroless plating. The electroless plating was carried out under an atmosphere of a high-pressure carbon dioxide. The electroless plating under the atmosphere of the high-pressure carbon dioxide allowed the plating film to grow from the inner portion (the inner side portion) in the vicinity of the surface layer of the molded article, so that the plating film could have high adhesion.

In this Example, as the high-pressure carbon dioxide for dissolving the metal complex and the assistant of the fluorine compound, there was used a liquid carbon dioxide of which the temperature is a normal temperature (24 to 26° C.) and the pressure, 15 MPa. As the metal complex, there was used a metal complex of hexafluoroacetyl-acetonatopalladium (II). As the assistant, there was used one of fluorine compounds, i.e., perfluorotripentylamine (the molecular formula: $C_{18}F_{36}O_6$, having a molecular weight of 821.1, a boiling point of 220° C., manufactured by SYNQUEST LABORATORIES, INC.). As the thermoplastic resin, there was used polyamide-6 (Nylon-6, NOVAMIDE GH10 manufactured by Mitsubishi Engineering-Plastics Corporation) admixed with 15% of glass fibers.

[Injection Molding Apparatus]

The schematic diagram of the plastic injection molding apparatus used in Example 1 is shown in FIG. 1. As shown in FIG. 1, the plastic injection molding apparatus comprises a sandwich injection molding section 201 and a high-pressure carbon dioxide-supplying section 202. The injection molding section 201 includes an injection unit 204 and a mold-clamping unit 205.

The mold-clamping unit 205 comprises a movable platen 32', a movable die 30 attached to the movable platen 32', a stationary platen 32, and a stationary die 33 attached to the stationary platen 32. The movable die 30 strikes the stationary die 33 (closing) to form two plate-like cavities 29 and 29' between the dies 30 and 33. In the injection molding section 201 of this Example, the movable platen 32' and the movable die 30 are moved vertically on Figure, interlocking with the actuation of an electromotive toggle mold-clamping mechanism (not shown), so as to open or close the dies 30 and 33.

The injection unit 204 comprises a plasticizing cylinder 10 for use in injection of a molten resin which will be formed into a surface skin (or a surface skin portion) of a molded article, and a plasticizing cylinder 18 for use in injection of a molten resin which will be formed into an inner skin (or an inner portion) of the molded article. When the molten resins are injected into the dies 30 and 33, the forward motion of the screw 34 of the plasticizing cylinder 10 injects the molten resin for the outer skin (or the surface skin portion) into the dies 30 and 33, and after that, the screw-switching valve 31 actuates to open the path of the plasticizing cylinder 18 towards the dies 30 and 33; and the forwarding motion of the screw 19 of the plasticizing cylinder 18 injects the molten resin for the inner skin (or the inner portion). A high-pressure carbon dioxide, a metal complex and a fluorine compound are supplied into the plasticizing cylinder 10 for use in injection of the molten resin for the surface skin (or the surface skin portion) of the molded article. The screw 34 of this plasticizing cylinder 10 has a shaft with an axial core having two bent portions 11 and 12 formed slender at two positions along the axial direction thereof.

The molten resin which is plasticized within the plasticizing cylinder 10 and is moved from the lower side to the upper side on Figure by normal rotation of the screw 34 is physically reduced in its pressure at the bent portions 11 and 12. That is, resin pellets (not shown) supplied from the hopper 28 into the plasticizing cylinder 10 are heated and pressurized to be plasticized within the plasticizing cylinder 10 and then are forcedly reduced in pressure at the first bent portion (hereinafter referred to as the first bent portion). When the piston 8 of the high-pressure carbon dioxide-introducing mechanism 7 is lifted (to the right on Figure) at an optional timing during the plasticizing and measuring operation, a high-pressure carbon dioxide and subject materials (a metal complex and a fluorine compound) dissolved in the high-pressure carbon dioxide are supplied into the first bent portion 11 from the high-pressure carbon dioxide-supplying section 202. The high-pressure carbon dioxide-introducing mechanism 7 is maintained at 30° C. with cooling water which flows through a cooling circuit (not shown) so as not to allow the metal complex to be thermally decomposed before it is supplied into the resin.

The resin material into which the high-pressure carbon dioxide and the subject materials dissolved in the high-pressure carbon dioxide have been supplied is kneaded by normal rotation of the screw 34 and is then pressurized between the first bent portion 11 and the second bent portion 12 and is then again reduced in pressure at the second bent portion 12. By this operation, the high-pressure carbon dioxide and the subject materials in dispersed states in the molten resin are reduced in pressure, so that the subject materials dissolved in the high-pressure carbon dioxide saturate and precipitate. When the air operate valve 39 is opened, the high-pressure carbon dioxide passes through the filter 23 and is released in the form of a gas into an air through the trap vessel and the vacuum pump. The second bent portion 12 is maintained at 60° C. with cooling water which flows through a cooling circuit (not shown) so as to inhibit sublimation of the metal complex. The inner pressures of the resin portions at the bent portions 11 and 12 are monitored by the pressure sensors 14 and 13.

The high-pressure carbon dioxide-supplying section 202 comprises, as shown in FIG. 1, a carbon dioxide bomb 17, three known syringe pumps 1, 1' and 1" (hereinafter referred to as 1 to 1"), two dissolution containers 6 and 6', six air operate valves 4, 4' and 4" (hereinafter referred to as 4 to 4") and 5, 5' and 5" (hereinafter referred to as 5 to 5") which are interlocked with the injection molding section 201 to automatically open or close three check valves 22, 22' and 22" (hereinafter referred to as 22 to 22") and piping which connects these to one another.

A high-pressure carbon dioxide is supplied to the respective syringe pumps 1 to 1" as follows: the manual valve 26 is opened, and the air operate valves 5 to 5" on the supply side are closed, and the air operate valves 4 to 4" on the suction side are opened; and, in this state, pistons (not shown) within the pumps 1 to 1" are actuated backward, so that a liquid carbon dioxide cooled to 10° C. is allowed to pass through the filter 27 from the liquid carbon dioxide bomb 17 and is then sucked into the respective syringe pumps 1 to 1". The peripheries of the heads of the syringe pumps 1 to 1" are cooled with chillers so that the carbon dioxide is cooled to 10° C. and is sucked as a liquid into the syringe pumps. The amount of the carbon dioxide as the liquid low in temperature and high in density can be measured more correctly than that as a gas high in temperature and low in density. Replenishment of the respective syringe pumps 1 to 1" with a high-pressure carbon dioxide is done at every molding shot. The pressures of the high-pressure carbon dioxide within the respective syringe pumps 1 to 1" are uniformed at substantially constant values.

Supply of a high-pressure carbon dioxide to the injection molding section 201 is done while the air operate valves 4 to 4" on the suction side are closed, and the air operate valves 5 to 5" on the supply side, opened. The three syringe pumps 1 to 1" receive an optional trigger signal from the injection molding section 201 during the plasticizing and measuring operation, and are driven at constant flow rates for a given time under an independent control, after completion of an optional delay timer (not shown). Under this situation, the high-pressure carbon dioxide which has dissolved the materials charged in supersaturated states in the first dissolution container 6 is fed from the first dissolution container 6 in association with the driving of the syringe pump 1; the materials in the second dissolution container 6' also are likewise fed from the second dissolution container 6' in association with the driving of the syringe pump 1'; and the high-pressure carbon dioxide containing no subject material is fed from the pump 1" in association with the driving of the syringe pump 1".

The three carbon dioxides fed as above are allowed to flow through the piping 3 and to pass through the check valves 22 to 22", and are then merged and mixed with one another in the piping 3, according to a ratio the flow rates of them. In the present invention, the high-pressure carbon dioxides having the different materials dissolved therein, respectively, are merged, and then may be mechanically stirred with a magnetic stirrer or through piping 3 with a stirring function, so as to be mixed.

The pressures of the respective high-pressure carbon dioxides under the flow rate control are controlled to be constant by the back pressure valve 9. Therefore, a given amount of carbon dioxide is supplied into the molten resin reduced in pressure in the first bent portion 11, under a given pressure for a given time, when the piston 8 of the high-pressure carbon dioxide-introducing mechanism 7 in the injection molding section 201 is lifted at an optional timing before and after the start of flowing of the high-pressure carbon dioxide having the material dissolved therein for the measurement in the heating cylinder 10. Since fluctuation in pressure within the piping 3 in a region between the back pressure valve 25 and the injection molding section 201 is monitored, carbon dioxide is stably supplied without a change in pressure even before and after opening or closing of the piston 8.

The capacities of the two dissolution containers 6 and 6' are 10 ml and 100 ml, respectively. The metal complex is charged in the first dissolution container 6, and the assistant, in the second dissolution container 6'. Both the dissolution containers 6 and 6' are equipped at their lower sides with magnetic stirrers 24 and 24', respectively, and the stirring elements 35 and 35' are always rotated at 300 rpm in the dissolution containers 6 and 6' in association with the driving of the magnetic stirrers 24 and 24'. By this stirring, the concentrations of the materials charged in the dissolution containers 6 and 6' are uniformly maintained. Again, sufficient amounts of the materials (enough for supersaturation) are cyclicly charged into the dissolution containers 6 and 6' so that the supersaturation of the materials can be always maintained. Correction of the charged amounts of the materials to the dissolution tanks 6 and 6' becomes possible by closing the four manual valves 20, 20', 21 and 21', followed by releasing the pressures in the two dissolution containers 6 and 6' with manual valves (not shown). The materials charged so as to maintain their supersaturation are dissolved in high pressure carbon dioxides, at solubilities equivalent to saturation concentrations and are allowed to pass through the filters 36 and 36' together with the high-pressure carbon dioxides and supplied into the injection molding section 201, in association with the driving of the syringe pumps 1 and 1'.

The three syringe pumps 1 to 1" are stopped in parallel with a timing when the piston of the high-pressure carbon dioxide-introducing mechanism 7 in the injection molding section 201 is closed, after the respective supply timers have counted given times during and after the supply of the materials at the given flow rates has been completed. After that, the three syringe pumps 1 to 1" are replenished with carbon dioxide in amounts equivalent to the amounts decreased by the supply, from the carbon dioxide bomb 17. In concrete, the air operate valves 5 to 5" on the supply side are closed; the valves 4 to 4" on the suction side are opened; and the syringes are moved backward, to thereby reduce the pressures within the syringe pumps 1 to 1", so that a high-pressure carbon dioxide as a liquid is supplied from the bomb 17. After that, the air operation valves 4 to 4" on the suction side are closed, and the syringe pumps 1 to 1" are pressurized, so that the pressures within the syringe pumps 1 to 1" are increased to substantially constant and predetermined pressures.

While the pressure and temperature of a high-pressure carbon dioxide may be optionally selected in the present invention, the pressure thereof was set at 15 MPa in this Example. The temperatures of the dissolution container 6 and 6' and the piping 3 were set at normal temperatures. Accordingly, a region from the pumps 1 to 1" and the respective dissolution containers 6 and 6' to the back pressure valve 9 and the high-pressure carbon dioxide-introducing mechanism 7 were maintained in pressure constantly at 15 MPa; and the pumps 1 to 1" in this state were ready for a trigger signal from the injection molding section 201. The injection molding section 201 outputted a trigger signal at every time when plasticization and measurement were performed. The high-pressure carbon dioxide-supplying section 202 supplied a high-pressure carbon dioxide and subject materials into the heating cylinder 10 at every time when this trigger signal was inputted.

[Injection Molding Process]

Firstly, a resin material was plasticized as follows. Two plasticizing cylinders 10 and 18 were heated to 240° C. by a band heater (not shown). Pellets (not shown) to be used as the resin material were dried and dewatered in a drier (not shown) and were then supplied from the hopper 28 (the hopper of the cylinder 18 being not shown) into the plasticizing cylinders 10 and 18. The resin pellets were allowed to pass through the grooves of the screws 34 and 19 in association with the rotations thereof, and were extruded in the forwarding direction of the screws 34 and 19 (on the side of the cavities 29 and 29' or the upward direction on FIG. 1) while being plasticized and molten. The screw 19 for use in formation of an inner skin was stopped after the measurement of an amount of the resin per one time of injection.

The screw 34 for use in formation of an outer skin supplied a high-pressure carbon dioxide and a subject material to the first bent portion 11, at a position on the midway during the measurement of the amount of the resin per one time of injection. This supply of the high-pressure carbon dioxide and the subject material was carried out by moving up the piston 8 of the high-pressure carbon dioxide-introducing mechanism 7, and concurrently controlling the flow rates of the three syringe pumps 1 to 1" to predetermined amounts for a predetermined time. In this Example, the control was so made that a ratio of the flow rates from the respective syringe pumps 1 to 1" could be 1:4:5, wherein the first syringe pump 1 supplied the high-pressure carbon dioxide having the metal complex dissolved therein; the second syringe pump 1' supplied the high-pressure carbon dioxide having the assistant dissolved therein; and the third syringe pump 1" supplied the high-pressure carbon dioxide containing none of them. In this case, the mixing ratio of the high-pressure carbon dioxide in which the metal complex saturated, to the high-pressure carbon dioxides other than the above high-pressure carbon dioxide was 1:9 (=4+5).

Then, the metal complex and the assistant were diluted to have lower concentrations (or unsaturation concentrations) because of the mixing of the three high-pressure carbon dioxides, and were then supplied into the heating cylinder 10, so that the metal complex and the assistant did not precipitate in the piping 3 or did not precipitate immediately after supplied into the heating cylinder 10. Thus, the metal complex and the assistant, kept in unsaturation states, were stably supplied into the molten resin. For this stable supply, the temperature of the fluid mixture found just before the supply was about 60° C. or lower, and that of the molten resin was 240° C. (cf., the thermal conversion temperature of the metal complex: about 150° C.), so that the fluid mixture was heated by this supply. However, the metal complex and the assistant did not precipitate because of their thermal conversion just after the supply thereof.

The weight of the surface skin portion of the molded article in this Example was about 20 g. The specific gravity of the high-pressure carbon dioxide under an atmosphere of the pressure (15 MPa) and the temperature in this Example was about 0.8 g/cm$^3$. The feed amount of the high-pressure carbon dioxide per one shot was set at 0.5 ml. The high-pressure carbon dioxide thus adjusted was supplied in an amount of about 0.6 g equivalent to 3% by weight of the molded article. According to the above-described mixing ratio, before the mixing, the carbon dioxide having the metal complex dissolved therein was supplied in an amount of 0.05 ml; the carbon dioxide having the assistant of the fluorine compound dissolved therein was supplied in an amount of 0.2 ml; and the carbon dioxide alone was supplied in an amount of 0.25 ml.

The present inventors measured a pressure in this Example, a pressure relative to a temperature in an environment, and the solubility of each of the materials in the respective high-pressure carbon dioxides at a normal temperature (i.e., a solubility equivalent to a saturation concentration). As a result, the solubility of the metal complex was 30 g/L; and that of the fluorine compound was 200 g/L. Accordingly, 0.3 g or more of the metal complex supplied was caused to saturate in the dissolution container 6 with a volume of 10 ml; and 20 g or more of the fluorine compound supplied was caused to saturate in the dissolution container 6' with a volume of 100 ml. Practically, the metal complex and the fluorine compound in amounts 10 times larger than the above amounts were supplied into the dissolution containers 6 and 6', respectively. The amounts of the metal complex and the assistant supplied into the resin per one shot were 1.5 mg and 40 mg, respectively. The subject materials in these amounts were consumed per one shot.

In the course of the measurement, the supply of the high-pressure carbon dioxides into the molten resin was started. Into the molten resin, there were supplied the high-pressure carbon dioxide, the metal complex and the assistant. The molten resin into which the high-pressure carbon dioxide, the metal complex and the assistant had been supplied at the first bent portion 11 was kneaded by the screw 34 while flowing between the first bent portion 11 and the second bent portion 12. By this kneading, the high-pressure carbon dioxide, the metal complex and the assistant were dispersed in the molten resin, and the metal complex was thermally converted into fine metal particles.

In this Example, the air operate valve 39 was opened at a timing when the molten resin having the high-pressure carbon dioxides supplied thereinto was allowed to flow to the second bent portion 12. The molten resin kneaded while flowing between the first bent portion 11 and the second bent portion 12 was rapidly reduced in pressure at the second bent portion 12. By this reduction in pressure, the carbon dioxide was gasified. The gasified carbon dioxide was allowed to pass through the cooled filter 23, the air operate valve 39 and the buffer tank 16 and was then exhausted from the vacuum pump 15. With this exhaustion of the carbon dioxide, the gases retained in the resin were also exhausted. As a result, the amounts of the carbon dioxide, etc. exhausted from the molded article during and after the molding step could be reduced, so that the smoothness of the surface of the molded article could be prevented from degrading.

On the other hand, the metal complex already had been thermally converted into the fine metal particles before reaching the second bent portion 12. Accordingly, the metal complex became hard to sublime together with the gasified carbon dioxide, so that the metal complex was not exhausted together with the carbon dioxide. By the exhaustion of the carbon dioxide from the molten resin, the fluorine compound, dispersed in the molten resin, became insoluble in the carbon dioxide, thus remaining in the molten resin. As a result, most of the fluorine compound could remain in the molten resin, despite the fact that the fluorine compound was heated in the molten resin up to a temperature exceeding the boiling point thereof. In this way, the metal complex and the assistant (or the fluorine compound) were not exhausted together with the carbon dioxide, but were uniformly dispersed in the molten resin, remaining therein.

In this connection, the high-pressure carbon dioxide supplied into the resin was not necessarily exhausted. For example, it was not needed to exhaust the high-pressure carbon dioxide in any of the following cases, that is, in case where only a small amount of the metal complex was supplied into the molten resin, so that the amount of the high-pressure carbon dioxide supplied was small (an amount able to be dissolved in the molten resin); and in case where the carbon dioxide supplied into the molten resin was intentionally left to remain therein, and was then exhausted from the molten resin at the subsequent step. When the molten resin still having the carbon dioxide left to remain therein was injected, the high-pressure carbon dioxide was gasified, leaving, during and after the molding step. In this case, the materials dissolved in the carbon dioxide segregated and remained on the surface skin portion of the molded article. In case where larger amounts of the metal complex and the assistant (the subject materials) were allowed to segregate on the surface skin portion of the molded article, the carbon dioxide was not permitted to be exhausted, or the exhausted amount thereof was decreased, at this supplying timing.

The introduction (or supply) of the high-pressure carbon dioxide, the metal complex and the assistant into the molten resin was continued even after the start of the exhaustion of at least the high-pressure carbon dioxide. By doing so, the concentrations of the metal complex and the assistant could be increased while the concentration of the high-pressure carbon dioxide in the molten resin was being inhibited from increasing. Further, by supplying the high-pressure carbon dioxide in a soluble amount or more in the molten resin (an amount soluble in the molten resin) into the molten resin, the metal complex and the assistant in amounts corresponding to this supplied amount could be dissolved in the resin.

In case where large amounts of the subject materials such as a metal complex and an assistant are supplied, a supplying time is considered to be longer than a measuring time. In this case, for example, the screw 34 may be repeatedly rotated normally and reversely during the plasticizing and measuring time. By such rotation, a supplying time can be ensured during the operation of kneading the molten resin with the high-pressure carbon dioxide. Particularly in this Example, the metal complex and the assistant were dissolved at unsaturation concentrations in the high-pressure carbon dioxides and were then supplied into the molten resin, and therefore, the supplying time therefor became longer than a supplying time in case where the metal complex and the assistant were dissolved at saturation concentrations in the high-pressure carbon dioxides and were then supplied. The amount of carbon dioxides required to be supplied was also increased. The operation of rotating the screw 34 normally and reversely was preferably employed so as to ensure a supply amount of carbon dioxide or a supplying time.

After completion of plasticization and measurement of the molten resin for use in formation of the surface skin portion of the molded article, the screw 34 was used to inject the measured molten resin into the cavities 29 and 29' of the dies at a high speed. The injection speed is needed to be high in order that the fine metal particles and the molten resin having the assistant dissolved therein could segregate as the surface skin portion of the molded article due to a fountain effect, and further in order to decrease the thickness of this surface skin portion. In concrete, the injection speed was desirably from 150 to 1,000 mm/s. In this Example, the molten resin was injected at 300 mm/sec.

After the injection of the molten resin for use in formation of the surface skin portion, the switching valve 31 was shifted to inject the resin for use in formation of the inner portion of the molded article, by moving forward the screw 19. Thus, a sandwich molded article was obtained.

[Plating Apparatus]

Figure 2:
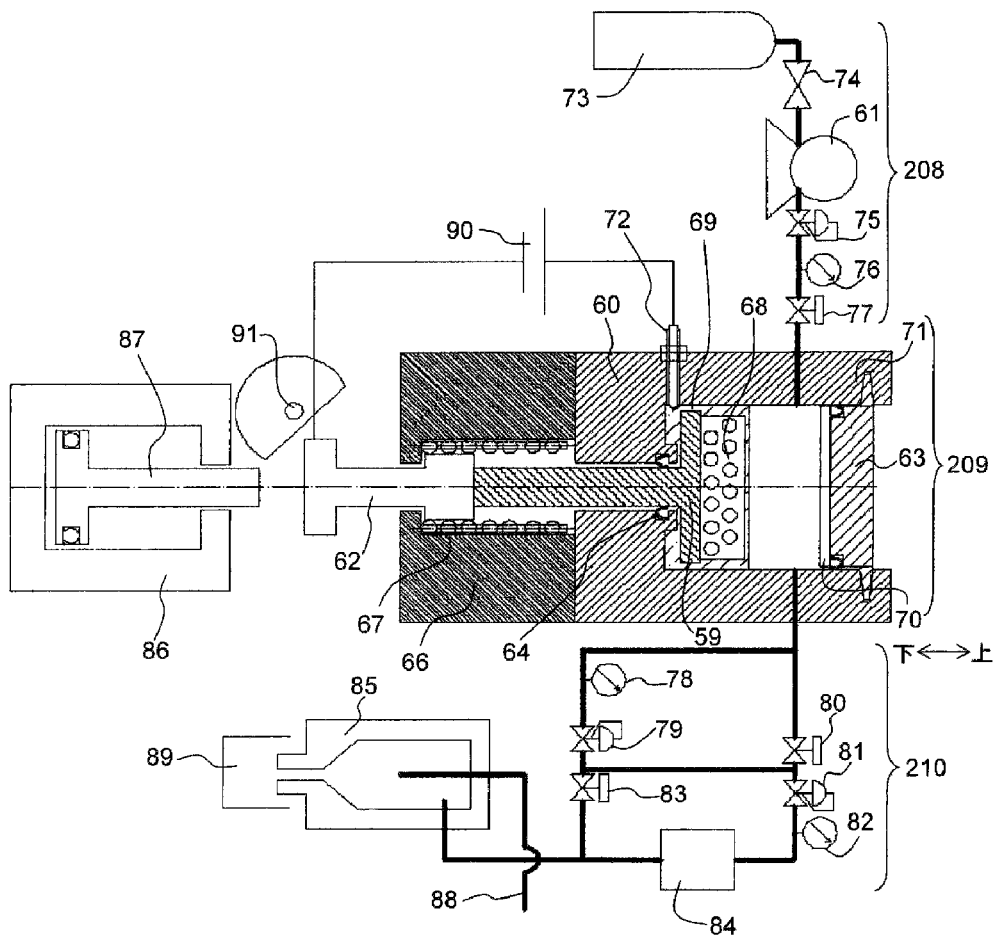
FIG. 2 shows a schematic diagram of the essential section of the electroless plating apparatus of Example 1.

FIG. 2 shows a schematic mechanism of the electroless plating apparatus used in Example 1. The plating apparatus used in this Example performs electroless plating under an atmosphere of a high-pressure carbon dioxide. The electroless plating apparatus essentially comprises a supply unit 208 for a high-pressure carbon dioxide, a high-pressure plating vessel 209 and an exhausting section 210.

The high-pressure plating vessel 209 mainly includes a plating stage 59, a vessel body 60 and a lid 63. The plating stage 59 and the vessel body 60 in their closed states are sealed under a high pressure by a seal 64. The plating stage can be driven up and down. The plating stage 59 is combined to a stage support 62, and the stage support 62 is aligned with a vessel body support 66 by a boll retainer 67. By this support structure, a unbalanced load is not applied to the seal 64, even when the plating stage is driven up and down, so that the damage of the seal 64 can be prevented.

Around the plating stage 59, a nickel-phosphorus plating solution 69 fills about half of the inner volume of the vessel body 60. Sample containers 68 are placed on the plating stage 59. Each sample container 68 is made of Teflon® hard to be plated, having a lot of pores formed on its side wall so that the plating solution is easy to circulate into the sample container 68. A lot of molded articles (not shown) are disposed within this sample container 68.

The plating stage 59 is controlled at 85° C. with temperature-controlling water (not shown), and the vessel body 60 is maintained at 25° C. with cooling water (not shown), so that the vessel body 60 is controlled at a low temperature and that the plating stage 59 is controlled at a high temperature. Accordingly, the plating solution 69 is lower in temperature in the proximity of the wall of the vessel body 60. When the plating solution 69 low in temperature is mixed with a high-pressure carbon dioxide, the density of the high-pressure carbon dioxide becomes higher in the proximity of the wall of the vessel body 60. On the other hand, the temperature of the plating solution 69 becomes higher around the plating stage 59. When the plating solution 69 high in temperature is mixed with a high-pressure carbon dioxide, the density of the high-pressure carbon dioxide becomes lower in the proximity of the plating stage. Thus, convection of the high-pressure carbon dioxide is caused due to this difference in density, and the plating solution and the high-pressure carbon dioxide are stirred because of this convection of the high-pressure carbon dioxide and therefore are suitably (or uniformly) compatibilized with each other.

A molded article sample is put in the plating solution, and then, the high-pressure vessel 209 is closed, and then, a carbon dioxide is supplied into the high-pressure vessel 209. The carbon dioxide supplied from the carbon dioxide bomb 73 through the manual valve 74 is gasified in a buffer container (not shown) and is then increased in pressure by the pump 61. The carbon dioxide adjusted to an optional pressure corresponding to setting of the pressure-reducing valve 75 is supplied into the high-pressure vessel 209. The supply of the carbon dioxide into the high-pressure vessel 209 is performed by the use of the automatic air operate valve 77. In this Example, this pressure was set at 15 MPa. Also, the air operate valve 83 is opened during the supply of the high-pressure carbon dioxide and during the electroless plating step, and the display on the pressure gauge 78 is set to always indicate 15 MPa by controlling the back pressure valve 79.

The stage support 62 is moved up and down in association with the rotation of the cam 91 of the motor during the plating step. Each sample container 68 moves up and down in the plating solution, together with the plating stage 59, so that the sample molded articles within the sample container 68 are agitated. Thus, the plating solution having the high-pressure carbon dioxide dissolved therein can be brought into stable and uniform contact with the sample molded articles.

In this regard, the temperature of the vessel body 60 is as low as 25° C., while a nickel-phosphorus plating film grows at a temperature higher than a plating reactive temperature (60° C.). Accordingly, any plating film is not formed on the vessel body 60, so that maintenance of the vessel body 60 is easy.

Again, in this Example, an electric field was applied between the plating solution 69 and the plating stage 59 from the DC power supply 90. Specifically, the electrode 72 was dipped in the plating solution in an insulated state from the vessel body 60; and an electric field with a polarity which caused reverse transfer of electric charges to the transfer of electric charges in a plating reaction was applied between this electrode 72 and the plating stage. By this application of the electric field, any plating film was not allowed to follow the periphery of the plating stage made of SUS. In an electroless plating (or chemical plating) reaction, metal particles to which electrons are donated are deposited by an oxidation reaction of metal ions such as nickel sulfate with a reducing agent. When electrons are donated to an objective material in contact with the plating solution, a plating film grows on this objective material. Therefore, an electric field is applied in a direction toward which electrons are released from the plating stage 59 which is not desired to be an objective to be plated, and a very weak electric current which counteracts the transfer of electrons equivalent to a plating reaction is allowed to pass, so that growth of a plating film on the plating stage 59 can be inhibited.

Figure 3:
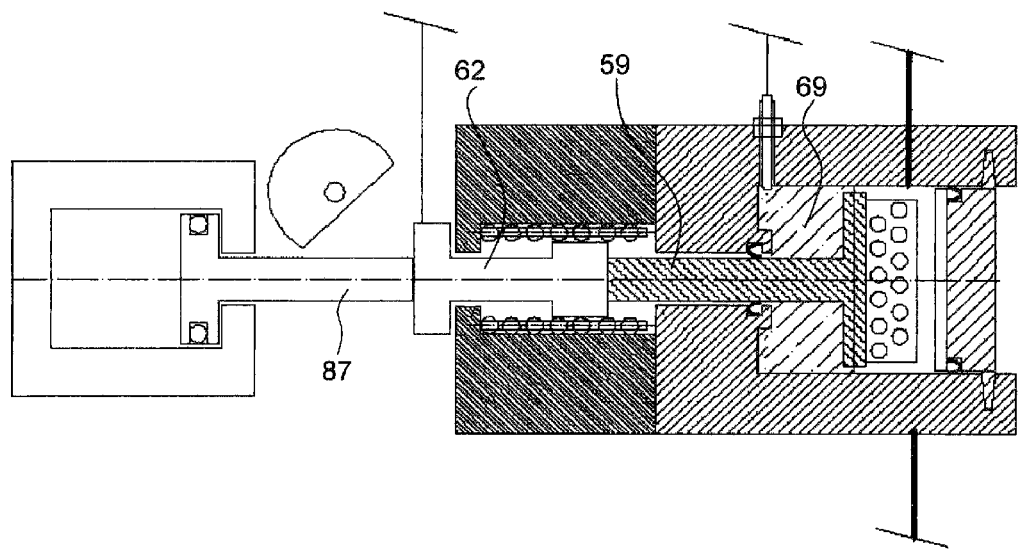
FIG. 3 shows a completed state of plating by the electroless plating apparatus shown in FIG. 2.

After completion of a predetermined plating reaction, the plating stage 59 is lifted upward. As shown in FIG. 3, the piston 87 in the air cylinder 86 is lifted up to thereby cause the piston 87 to push up the plating stage 59, so that the plating stage 59 is lifted above the liquid level of the plating solution 69 to make it possible to take out the plating stage 59 and the sample container 68 from the bath of the plating solution 69. Under this condition, the periphery of the molded article sample is free from the plating solution, so that the growth of a plating film on the molded article sample can be forcedly stopped.

After the forcedly stopping of the plating film growth by taking out the molded article sample from the plating solution, the high-pressure carbon dioxide is exhausted. The air operate valve 83 in the exhaustion section 210 is closed, and the automatic air operate valve 80 is opened, and then, the flow rate measured with the flow monitor 84 is controlled to an optional flow rate. By this control, the pressure-reducing rate in the high-pressure vessel 209 is controlled, so that it becomes possible to prevent foaming of the resin on the surface portion of the plated molded article, which leads to prevention of degradation of the molded article. Also, the inner pressure of the high-pressure vessel 209 is reduced by the pressure reducing valve 81 until the pressure gauge 82 indicates 1 MPa, and then, the automatic valve 83 is opened, so that the high-pressure vessel 209 can be opened to an air. The exhausted carbon dioxide is separated from the plating solution in the trap container 89 of the recovery container 85, and is then recovered through the exhaust port 88. A part of the plating solution and alcohol exhausted together with the high-pressure carbon dioxide are recovered in the container 89 and are recycled.

In this regard, when the high-pressure carbon dioxide is exhausted while the molded article sample is left to be dipped in the plating solution, differently from this Example, the high-pressure carbon dioxide is preferentially exhausted from a site of the molded article sample close to the liquid level of the plating solution. In other words, in comparison between a sample which deeply sinks in the plating solution and a sample which is close to the liquid level of the plating solution, it is found that the high-pressure carbon dioxide is preferentially exhausted from the sample close to the liquid level. When such a difference in exhausting rate occurs in the high-pressure carbon dioxide, a stress caused in the interface between the plating solution and the resin molded article differs depending on an individual substance or a site, with the result that adhesion of the resultant plating film may be variable. In this Example, this difference in stress is not caused by lifting up the plating stage 59 above the liquid level of the plating solution 69 before the exhaustion of the high-pressure carbon dioxide, and exhausting the high-pressure carbon dioxide after allowing no plating solution to remain on the periphery of the sample. Accordingly, the adhesion of the resultant plating film is stabilized. Consequently, the quality of plating films on a plurality of mass-produced molded articles can be uniformed.

[Plating Method]

An electroless plating film was formed on the molded article obtained in this Example, using the electroless plating apparatus shown in FIG. 2. As the electroless plating solution, there was used a nickel-phosphorus plating solution containing 40% by vol. of alcohol (ethanol). Addition of the alcohol to the plating solution is effective to improve the affinity of the plating solution with a carbon dioxide, so that the plating solution can have a lower surface tension. The alcohol therefore acts to assist the penetration of the plating solution into the resin molded article.

Firstly, a lot of molded articles were held in the sample container 68, and the sample container 68 was set on the plating stage 59. The plating stage 59 was controlled at 85° C., and the molded articles had been pre-heated at 50° C. (slightly lower than a plating reaction temperature). After that, the plating solution was charged, and the lid 63 was closed by engaging the clutch 71, and the automatic valve 77 was opened to supply a high-pressure carbon dioxide into the high-pressure plating vessel 209.

When the high-pressure carbon dioxide was supplied, a difference in density was caused in the high-pressure carbon dioxide so that vigorous convection was caused in the high-pressure carbon dioxide. The cam 91 was rotated to continuously move the stage support 62 and the plating stage 59 up and down at a constant cycle. By the convection of the high-pressure carbon dioxide and the up and down motion of the plating stage 59, the high-pressure carbon dioxide and the plating solution were uniformly mixed, and the plating solution was allowed to penetrate the molded articles together with the high-pressure carbon dioxide. Thus, the plating solution uniformly penetrated the molded articles.

The temperatures of the molded articles were raised by transmission of heat from the plating stage 59. When the temperatures of the molded articles were raised to a temperature higher than the plating reaction temperature, a plating reaction occurred from the inner portions of the molded articles due to the plating solution which had penetrated the molded articles together with the high-pressure carbon dioxide. Since the growth of plating films started from the inner portions in the proximity of the surfaces of the molded articles, the plating films deep-rooted in the molded articles were formed so that the adhesion of the plating films became higher.

The fluorine compound allowed to penetrate the molded article as the assistant for the metal complex was dissolved in the high-pressure carbon dioxide allowed to penetrate the molded articles during the plating step and was then extracted. The fluorine compound acts as one of the factors to degrade the wettability of the molded article relative to the plating solution or to degrade the adhesion of the plating film to the molded article. However, by extracting the fluorine compound with the high-pressure carbon dioxide, such an adverse influence was eliminated. Further, clearances were formed at the sites from which the fluorine compound was extracted, so that penetration of the high-pressure carbon dioxide and the plating solution into the molded article was further facilitated.

After a plating film had been formed over the surface of the molded article in a desired and predetermined time, the piston 87 of the air cylinder 86 was moved upward as shown in FIG. 3, so that the plating stage support 62, the plating stage 59, the sample container 68 and the molded articles therein were pushed up above the plating solution 69. Thus, the plating reaction on the molded article was completed.

After that, the valve 83 was closed, and the automatic air operate valve 80 was opened, so that the carbon dioxide was exhausted to reduce the inner pressure to 1 MPa, while the flow rate was being controlled to moderately reduce the inner pressure. After that, the valve 83 was opened to utterly exhaust the carbon dioxide. Further, the surfaces of the molded articles subjected to this electroless plating treatment were subjected to a Cu electrolytic plating treatment under a normal pressure to form copper plating films with thickness of 40 μm thereon, and were further subjected to a known nickel plating treatment to deposit nickel plating films with thickness of 1 μm thereon. Thus, the plastic molded articles of this Example were obtained.

The molded articles obtained in this Example were subjected to a heat cyclic test wherein the temperature was switched between −40° C. and 150° C. a predetermined number of times. As a result, no plating film was peeled off from any of the molded articles, and any of the molded articles was not swollen. Further, a vertical tensile test (according to JIS H8630) was conducted in order to measure the adhesion strengths of the plating films on the flat surfaces of the molded articles. As a result, the adhesion strengths thereof were found to be from 8 to 13 N/cm, which substantially achieved a target value, i.e., 10 N/cm as a sufficient judgment index employed in the conventional ABS/etching plating.

According to the plating method of the present invention wherein subject materials such as a metal complex, etc. having solubilities equivalent to unsaturation concentrations, are supplied into a molten resin as described above, plating films with high adhesion are formed on the molded articles, and such plating films are stable among each of molded articles. In this Example, the high-pressure carbon dioxide in which the metal complex saturated was diluted about 10 folds and was then supplied into the heated and molten resin. Therefore, in comparison with the direct supply of a high-pressure carbon dioxide in which the metal complex saturated, as it was, into the heated and molten resin, it became possible to markedly increase a number of times of injection of the molten resin per one shot of charge of the metal complex. When the high-pressure carbon dioxide in which the metal complex saturated, as it was, was actually supplied, the number of times of injection was limited to at most from about 10 to about 20 shots per one shot of charge of the metal complex. However, in this Example, the number of times of injection was 200 shots. Further, any fine metal particle did not precipitated at the first bent portion 11, despite the fact that the temperature of the molten resin was higher than the thermal conversion temperature of the metal complex. Furthermore, the plating films with high adhesion strengths described above could be mass-produced.

EXAMPLE 2

In Example 2, as subject materials to be supplied into a molten resin together with a high-pressure carbon dioxide, there were used tetraethoxysilane (TEOS) which was a metal alkoxide, in addition to a metal complex and a fluorine compound. Besides, hydrochloric acid or ammonia as a catalyst, and water for accelerating a reaction may be added. Further, water admixed with a surfactant was more compatible with carbon dioxide.

In this Example, after the supply of the high-pressure carbon dioxide containing the metal complex and the fluorine compound at predetermined unsaturation concentrations, this high-pressure carbon dioxide was changed to a high-pressure carbon dioxide containing TEOS alone at a predetermined unsaturation concentration, which was then supplied. These subject materials, dissolved in the high-pressure carbon dioxide, were supplied from the first bent portion 11 into the molten resin, as well as Example 1. Otherwise, a high-pressure carbon dioxide which contained TEOS together with the metal complex and the fluorine compound at unsaturation concentrations from the beginning might be supplied, and then, this high-pressure carbon dioxide might be changed to a high-pressure carbon dioxide containing TEOS alone at a predetermined unsaturation concentration.

Further, exhaustion of the carbon dioxide from the second bent portion 12 was not started until the molten resin which the metal complex and the fluorine resin had penetrated had passed through the second bent portion 12. After the molten resin which the metal complex and the fluorine resin had penetrated had passed through the second bent portion 12, the exhaustion of the carbon dioxide was started. After the start of this exhaustion, the supply of the high-pressure carbon dioxide containing TEOS into the resin was continued. Thus, a large amount of TEOS was allowed to penetrate the molten resin. In this regard, TEOS was hydrolyzed (dehydro-condensation reaction) due to the moisture of the water-absorbing resin, and a part of the resultant product was synthesized into carbon dioxide.

Further, electroless plating was conducted on the injection-molded plastic articles in a high-pressure carbon dioxide atmosphere, as well as in Example 1.

[Injection-Molding Apparatus]

Figure 4:
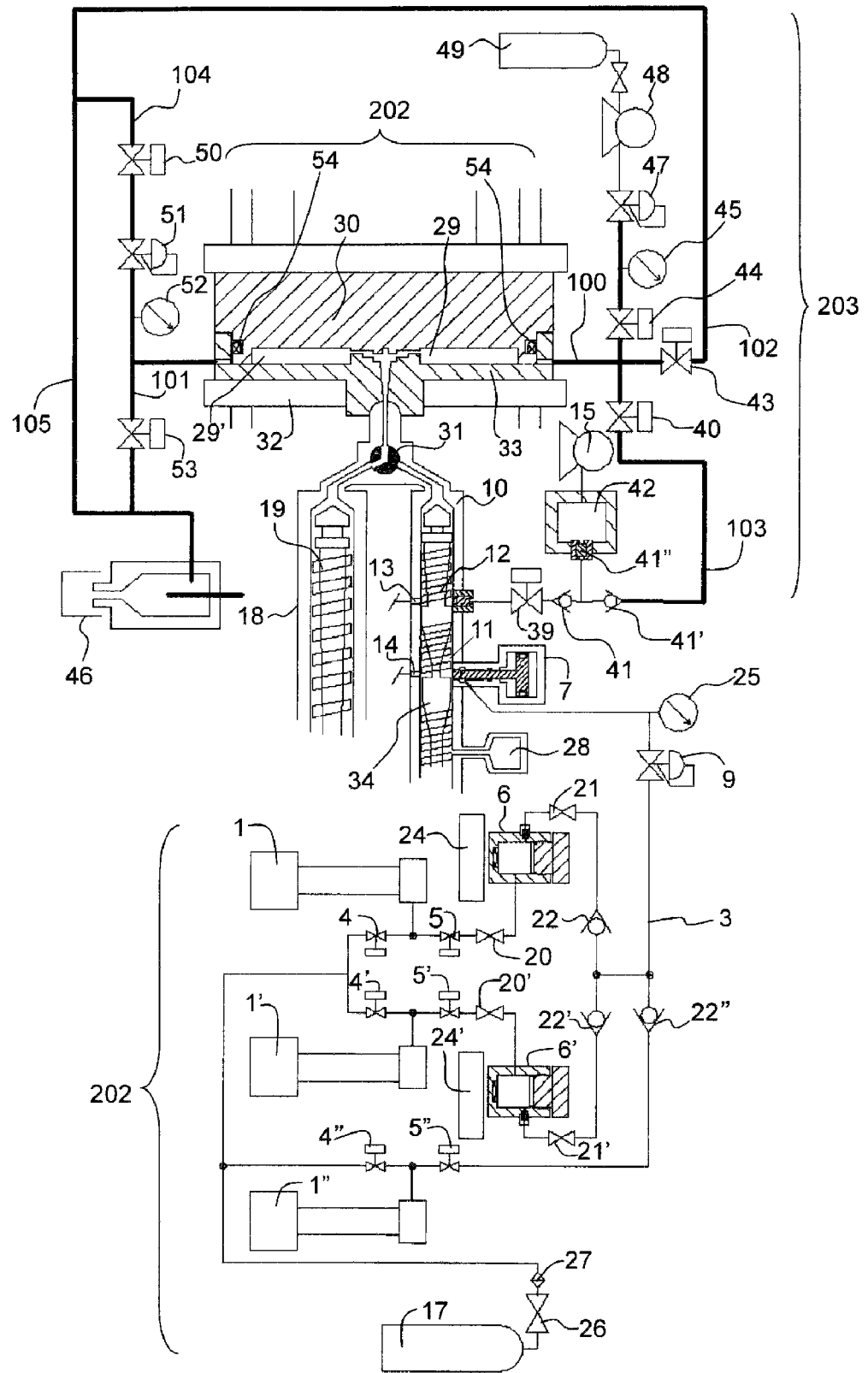
FIG. 4 shows a schematic diagram of the essential section of the molding apparatus of Example 2.

The schematic mechanism of the plastic injection molding apparatus used in Example 2 is shown in FIG. 4. The plastic injection molding apparatus used in this Example comprises a sandwich injection molding section 201, a high-pressure carbon dioxide-supplying section 202 and an extracting section 203 with the use of a high-pressure carbon dioxide.

The supplying section 202 for a high-pressure carbon dioxide is the same as that used in Example 1. However, in this Example, the first dissolution container 6 is charged with a fluorine compound (perfluorotripentylamine) as an assistant together with the metal complex. Since the fluorine compound is a liquid, the fluorine compound is dispersed in a wet support (manufactured by ISCO) as a liquid carrier and is charged in the first dissolution container so as not to allow out-flowing thereof together with the liquid high-pressure carbon dioxide. The second dissolution container 6' is charged with TEOS, using a wet support. TEOS is a precursor of silicon dioxide and is soluble in a high-pressure carbon dioxide.

When the high-pressure carbon dioxide is supplied into the molten resin, the high-pressure carbon dioxide, being compressed to the same pressure (15 MPa) as that in Example 1, is driven at constant flow rates corresponding to a ratio of flow rates from the syringe pumps 1, 1' and 1", so that the carbon dioxide in which the metal complex and the assistant have saturated, the carbon dioxide in which TEOS has saturated, and a carbon dioxide containing none of these subject materials are mixed within the piping 3. The metal complex, the assistant and TEOS are diluted to their unsaturation concentrations, respectively. The resulting fluid mixture is supplied from the high-pressure carbon dioxide-introducing mechanism 7' into the molten resin within the heating cylinder through the back pressure valve 9' and the pressure gauge 25', under a predetermined pressure.

The dies 30 and 33 of the injection molding section 201 commonly have a polyimide sealing member 54 including a spring therein. This sealing member 54 is attached to one of the stationary die 33 and the movable die 30, surrounding the cavities 29 and 29'. The cavities 29 and 29' are sealed (or tightly closed) because of the sealing member 54, even when the stationary die 33 and the movable die 30 are slightly opened from each other.

The heating cylinder 10 has a second bent portion 12. Exhaustion of the carbon dioxide from the molten resin can be optionally controlled by controlling the automatic valve 39 to open or close.

The extracting section 203 includes an automatic air operate valve 40. When the automatic air operate valve 40 is opened while the resin is being injected into the dies 30 and 33, the cavities 29 and 29' are connected to the vacuum pump 15 via the check valve 41, the filter 41" and the buffer container 42. Suction by the vacuum pump 15 draws the high-pressure carbon dioxide from the resin packed in the dies 30 and 33, and the drawn high-pressure carbon dioxide is then exhausted. In this stage, the low molecular weight materials dissolved in the resin are migrated to the surface side of the resin, together with the high-pressure carbon dioxide, so that segregation of the low molecular weight materials on the skin portion of the molded article is facilitated.

The molding apparatus used in this Example further has a function to extract the subject materials dissolved in the high-pressure carbon dioxide from the molded article within the dies 30 and 33 by bringing a high-pressure carbon dioxide into contact with the resin shaped after the molding. The extracting section 203 therefore has a supplying mechanism and an exhaustion mechanism. The pump 48 pressurizes carbon dioxide taken out of the carbon dioxide bomb 49, and the pressure-reducing valve 47 is used to control the pressure of the pressurized carbon dioxide so that the pressure gauge 45 can indicate a predetermined pressure. When the automatic air operate valve 44 is opened, the pressurized carbon dioxide controlled to this predetermined pressure is supplied from the introduction pipe 100 into the cavities 29 and 29'. The carbon dioxide supplied into the cavities 29 and 29' passes through the cavities 29 and 29' and exits from the exhaustion pipe 101 of the exhaustion mechanism. The back pressure valve 51 of the exhaustion mechanism controls a primary pressure on the side of the cavities so that the indication on the pressure gauge 52 can be kept at the predetermined pressure. When the automatic valve 50 is opened, the high-pressure carbon dioxide having passed through the back pressure valve 51 is exhausted into the recovery container 46 through the exhaustion pipes 104 and 105. By setting the back pressure valve 51 at a pressure lower than the set pressure for the pressure-reducing valve 47, flowing of the high-pressure carbon dioxide due to a constant difference in pressure can be caused within the cavities 29 and 29'. By this contact treatment with the high-pressure carbon dioxide on the resin shaped after the molding, the subject materials which are dissolved in the high-pressure carbon dioxide and which have penetrated the proximity of the surface of the molded article can be extracted before completion of the molding treatment. After this extracting treatment, the supply of the carbon dioxide is stopped, and the valves 43 and 53 are opened. In this way, all the carbon dioxide left to remain in the cavities 29 and 29' and the piping 3 can be exhausted.

[Injection Molding Method]

In this Example, the molding apparatus shown in FIG. 4 was used to shape a sandwich molded article. Immediately after the start of measurement in the heating cylinder 10, the high-pressure carbon dioxide-introducing mechanism 7 was actuated to start driving of the first syringe pump 1 and the third syringe pump 1". By this operation, a high-pressure carbon dioxide in which the metal complex and the fluorine compound saturated and a high-pressure carbon dioxide containing none of these subject materials were mixed in the first dissolution container 6, so that a high-pressure carbon dioxide containing the metal complex and the fluorine compound at unsaturation concentrations was introduced into the heating cylinder. In this Example, the supply amount of the first syringe pump 1 was set at 0.05 ml; and that of the third syringe pump 1", at 0.45 ml. The metal complex and the fluorine compound were diluted 10 folds to have concentrations 1/10 of their saturation concentrations. The amount of the high-pressure carbon dioxide was equivalent to about 3% by weight of the resin material.

After that, only the first syringe pump 1 was stopped, and driving of the second syringe pump 1' was started to mix the high-pressure carbon dioxide from the pump 1' with the high-pressure carbon dioxide from the third syringe pump 1" which had been continuously driven. The supply amount of the high-pressure carbon dioxide from the second syringe pump 1' was set at 2.5 ml; and that of the high-pressure carbon dioxide from the third syringe pump 1", at 2.5 ml the same as that from the second syringe pump 1'. Thus, TEOS was diluted to have a unsaturation concentration a half of its saturation concentration. It becomes apparent that the solubility of TEOS would be at least 400 g/L or more in a high-pressure carbon dioxide which had such a temperature and such a pressure as used in this Example. In other words, the maximum amount of TEOS which could be supplied per one shot was about 1 g. In this case, the total supply amount of the carbon dioxide was 5 ml. This amount was equivalent to 30% by weight of the resin material, and was an excessive amount impossible to be dissolved in the resin material.

To overcome this disadvantage, in this Example, the automatic air operate valve 39 was opened to exhaust the high-pressure carbon dioxide from the molten resin, at a point of time when the plasticization and measurement of the molten resin had proceeded after the start of supply of the high-pressure carbon dioxide having TEOS dissolved therein. The high-pressure carbon dioxide separated from the molten resin was exhausted from the second bent portion 12 via the filter 41", the buffer container 42 and the vacuum pump 15. At this point of time, the resin having the metal complex and the assistant diffused therein was pushed out on the front side from the tip end of the screw 34, that is, on the tip end side from the second bent portion 12. Therefore, it was possible to prevent sublimation of the metal complex and the assistant with the exhausted high-pressure carbon dioxide, to thereby prevent exhaustion of the metal complex and the assistant together with the high-pressure carbon dioxide.

By exhausting the high-pressure carbon dioxide from the second bent portion 12, the amount of the high-pressure carbon dioxide in the molten resin could not be excessive, even if supply of a high-pressure carbon dioxide into the molten resin was sequentially continued. Therefore, the molten resin was not separated from the high-pressure carbon dioxide. It was possible to introduce a high-pressure carbon dioxide in an amount exceeding the limit of the amount (or concentration) of a high-pressure carbon dioxide possible to be supplied into the molten resin. That is, the amount of the high-pressure carbon dioxide possible to be dissolved in the molten resin was limited, so that the subject material limited in its amount could be introduced in an amount exceeding its limited amount into the molten resin. TEOS additionally introduced was kneaded with the molten resin, together with the high-pressure carbon dioxide and was mixed into the molten resin. A part of TEOS was reacted with a trace of moisture in the resin to be hydrolyzed and was converted into silicon dioxide. At that time, water and alcohol were produced as by-products, which were dissolved in the high-pressure carbon dioxide and were exhausted together with the high-pressure carbon dioxide from the second bent portion 12. Therefore, an adverse influence attributed to the water and alcohol left to remain in the resin could be avoided.

In the molded article-producing method of the present invention, large amounts of TEOS and high-pressure carbon dioxide are needed to be supplied and kneaded into the molten resin. Therefore, in order to knead the plasticized and molten resin with a high-pressure carbon dioxide in a supercritical state (one of inert gases), the screw 34 may be stopped or may be repeatedly rotated normally and reversely while the molten resin is being plasticized and measured. Usually, the screw 34 is continued to be normally rotated while the molten resin is being plasticized and measured. The molten resin is fed to the forward of the screw 34 by the normally rotated screw 34, and the inner pressure of the resin at the tip end portion of the screw 34 is raised. In the conventional plasticization and measurement, the normal rotation time for the screw 34 is limited, which consequently limits the high-pressure carbon dioxide-supplying time within this time. When the metal complex is contained at a unsaturation concentration, this time is likely to be insufficient.

To be independently of this time limit and to make it possible to supply a larger amount of carbon dioxide than an amount thereof possible to be supplied within this time limit, the screw 34 may be stopped or may be rotated by bits by normally and reversely rotating the screw 34, while the molten resin is being plasticized and measured. When the screw 34 is stopped or rotated reversely, there occurs fluctuation in the inner pressure of the resin being plasticized and measured. However, despite this fluctuation, the high-pressure carbon dioxide and the subject materials can be sufficiently kneaded into such a molten resin. Further, a longer kneading time makes it possible to exhaust a larger amount of the carbon dioxide and makes it possible to supply a larger amount of the high-pressure carbon dioxide. In this Example, the screw 34 was stopped before completion of the plasticization and measurement of the molten resin, and the rest of the high-pressure carbon dioxide having TEOS dissolved therein at a unsaturation concentration was supplied while the screw 34 was being rotated normally and reversely, so that exhaustion could be so performed as not to separate the carbon dioxide in the resin.

In this Example, the automatic valve 40 of the extracting section 203 was opened just before the injection of the molten resin from the heating cylinder 34 into the dies 30 and 33. By this operation, an air, etc. in the cavities 29 and 29' were sucked by the vacuum pump 15 via the piping 3103, the check valve 41', the filter 41" and the buffer container 42, and thus was exhausted in vacuum.

After that, in the same manner as in Example 1, the molten resin was injected into the dies 30 and 33 in this order from the two heating cylinders 10 and 18, to obtain a molded article. In the molded article of this Example, the metal complex and the fluorine compound which had lower molecular weights were more and more bled out to segregate on the surface of the molded article and the inner portion thereof in the proximity of the surface. The catalytic nuclei (the metal complex or fine metal particles) for plating were concentrated on the surface skin portion of the molded article. Further, silicon dioxide and its precursor were dispersed on the surface skin portion of the molded article, so that the hardness and wettability of the molded article were improved.

The molded article obtained in Example 2 was subjected to electroless plating under an atmosphere of a high-pressure carbon dioxide and was sequentially subjected to electrolytic plating to form a metal film on the molded article in the same manners as in Example 1. The plated molded article was subjected to a weathering test in the same manner as in Example 1, and the adhesion of the plating film was found to be sufficiently high. The adhesion strength of the plating film on the flat portion was measured by a vertical tensile test (JIS H8630) and was found to be 13 to 18 N/cm which was higher than that of the molded article obtained in Example 1. It is considered that the surface wettability of the molded article obtained in Example 2 was improved so that the adhesion of the molded article to the metal would be improved.

Example 3

In this Example, a silicone oil (having an average molecular weight of 500) modified at its end with amine was used instead of TEOS. Except for this, a molded article was shaped in the same manners as in Example 2, using the same materials and the same apparatus. The silicone oil was supplied in a large amount into the molten resin.

Thus, the metal complex, the fluorine compound and the silicone oil were allowed to penetrate the molten resin. These penetration materials (i.e., the subject materials to be dissolved in the high-pressure carbon dioxide) were supplied into the molten resin in the following procedure.

This will be described in detail. Firstly, the metal complex and the fluorine compound were dissolved at predetermined unsaturation concentrations in the high-pressure carbon dioxide, and this fluid mixture was supplied into the molten resin which was being measured in the plasticizing cylinder 10. After completion of the supply of the high-pressure carbon dioxide having the metal complex and the fluorine compound dissolved therein, the air operate valve 39 was opened, and simultaneously, the high-pressure carbon dioxide was switched to a high-pressure carbon dioxide having the silicon oil dissolved therein, which was then supplied. A large amount of the high-pressure carbon dioxide having the silicon oil dissolved therein was supplied while being exhausted from the air operate valve 39. After completion of a series of the supplying process described above, a large amount of the silicone oil was dissolved in the molten resin, together with the predetermined amounts of the metal complex and the fluorine compound.

In this regard, the order of supplying the metal complex, the fluorine compound and the silicone oil into the molten resin is not limited to the above-described one. For example, firstly, a high-pressure carbon dioxide having the metal complex, the fluorine compound and the silicone oil dissolved therein at predetermined unsaturation concentrations was supplied into the molten resin being measured; after completion of the supply of predetermined amounts of the metal complex and the fluorine compound, the air operate valve 39 was opened, and simultaneously, a high-pressure carbon dioxide having the silicone oil dissolved therein was used instead of the previous high-pressure carbon dioxide and was introduced. In this case, the silicone oil was supplied into the molten resin at a point of time when the introduction of the high-pressure carbon dioxide had been started.

In a molded article shaped by the use of this molten resin, a large amount of the silicone oil high in heat resistance segregated on the surface skin portion of the molded article, so that the molded article was improved in heat resistance. The molded article also had water repellency. In this connection, the use of a silicone oil having a highly reactive vinyl group is effective to produce a hybrid material in the resin by polymerizing a silicon atom in the resin or reacting with other kind of monomer or a metal alkoxide.

Again, in this Example, the molten resin was injected and packed into the dies 30 and 33, and the dies 30 and 33 were opened by 0.5 mm from each other after the surface portion of the resulting molded article had been solidified. Since the polyimide sealing member 54 including a spring therein was disposed between the movable die 30 and the stationary die 33, the cavities 29 and 29' were held in a sealed state (or a tightly closed state) even when the dies were opened from each other by 0.5 mm.

After the very slight opening of the dies 30 and 33 from each other, a high-pressure carbon dioxide was introduced into the cavities 29 and 29'. In concrete, the high-pressure carbon dioxide was increased in pressure to 15 MPa by the booster pump 48, and the automatic valve 44 was opened. Thus, the high-pressure carbon dioxide was introduced from the introduction pipe 100 into the cavities 29 and 29'. The high-pressure carbon dioxide, having passed through the cavities 29 and 29', was allowed to flow into the recovery container 46 via the exhaustion pipe 101, the back pressure valve 51, the automatic valve 50 and the exhaustion pipes 104 and 105. The high-pressure carbon dioxide was allowed to flow in the cavities 29 and 29' because of a constant difference in pressure. Because of the contact with the high-pressure carbon dioxide, the fluorine compound and the silicone oil which segregated on the proximity of the surface of the molded article in the cavities 29 and 29' were dissolved in the high-pressure carbon dioxide and extracted. Further, a part of the silicone oil was released from the molten resin and was then adhered to the inner surfaces of the dies 30 and 33 in advance during the injection molding step. Accordingly, by the circulation of this high-pressure carbon dioxide, the dirt on the inner surfaces of the dies 30 and 33 was cleaned off. That is, the dies 30 and 33 could be maintained clean, so that the quality of mass-produced molded articles could be ensured.

After that, the molded article obtained in this Example was subjected to electroless plating and electrolytic plating by the same methods, using the same apparatus as in Example 1. The molded article was also subjected to a weathering test in the same manner as in Example 1. As a result, it was found that the plating film had high adhesion to the molded article and had no problem. The molded article was subjected to a vertical tensile test (JIS H8630) to measure the adhesion strength of the plating film on the flat portion of the molded article. As a result, the adhesion strength thereof was found to be 20 to 25 N/cm which was far higher than those of the plating films of the molded articles obtained in Examples 1 and 2. This is considered to be because of a high anchoring effect which could not be obtained from the plating films of the molded articles of Examples 1 and 2: that is, the silicone oil introduced into the molded article was extracted in the dies 30 and 33, so that lots of fine pores were formed on the surface of the molded article; and a larger amount of the plating solution was allowed to deeply penetrate the molded article from the lots of fine pores, with the result that the above-described high anchoring effect was produced.

For evaluation of Example 3, the molded article obtained in this Example was subjected to electroless plating under an atmospheric pressure (i.e., the conventional electroless plating) and was further subjected to electrolytic plating in the same manner as in Example 1, followed by a weathering test. As a result, no peeling was observed in the resultant plating film of the molded article. As a result of a vertical tensile test, the adhesion strength of the plating film was about 7 to about 10 N/cm, which was a satisfactory level in practical use but was not so higher than those found in Examples 1 and 2.

The following are known from this fact: firstly, the molded article of this Example could have the plating film with an adhesion strength meeting a practical level, by directly subjecting the molded article taken out of the dies 30 and 33, to electroless plating without any pre-treatment for plating; and secondly, the plating film of the molded article of this Example could have a high adhesion strength which could not be obtained by the conventional electroless plating, by further subjecting the molded article of this Example to electroless plating with the use of a high-pressure carbon dioxide.

Example 4

In this Example, polycarbonate was used as the resin material. The metal complex and the fluorine compound were charged in the first dissolution container 6, and ϵ-caprolactam was charged in the second dissolution container 6' together with the silicone oil. Then, the molten resin was injected for molding in the same manner as in Example 3, and the materials dissolved in the high-pressure carbon dioxide were extracted from the molded article within the dies 30 and 33. During the kneading step, the ε-caprolactam could be widely dispersed in the molten polycarbonate resin because of its high solubility in the high-pressure carbon dioxide. In addition, the ε-caprolactam was a reactive monomer, and therefore, the ring-opening polymerization thereof was possible by heating to a high temperature, so that a part thereof was formed into 6-Nylon. Because of the extraction of the silicone oil and the fluorine compound, lots of fine pores were formed on the surface of the molded article, which facilitated the penetration of the plating solution into the molded article.

As a result of the present inventors' studies, it is known that the catalyst-donating method by the metal complex and the electroless plating with the use of high-pressure carbon dioxide are well compatible with a polymer having an amide group. However, these methods are not compatible with an amorphous material such as polycarbonate, and thus, it was hard to form a plating film having a high adhesion strength. The following reasons therefor are considered: the use of an amorphous material tends to lower thermal reduction of the metal complex; and because of penetration of a high-pressure carbon dioxide into a molded article during plating with the use of the high-pressure carbon dioxide, the molded article is swollen and excessively deformed, with the result that the plating film is hard to be fixed on the molded article.

In this Example, the ε-caprolactam was dispersed in the molten resin to be polymerized into Nylon, so that Nylon was island-like dispersed in the molten polycarbonate resin to improve the strength of the molded article. For this effect, the molded article was hard to deform during the plating with the use of a high-pressure carbon dioxide, and also was hard to deform during the extraction of the materials. Further, because of the island-like Nylon present among the anchors of the plating film or just under the anchors, the anchoring effect of the plating film could be improved as compared with a plating film of a molded article shaped of a single and homogeneous material.

The molded article of this Example was subjected to electroless plating under an atmosphere of a high-pressure carbon dioxide in the same manner as in Example 1, and was further subjected to electrolytic plating to form a metal film. The resulting molded article was subjected to a weathering test in the same manner as in Example 1. As a result, any problem such as swelling was not observed. Further, the adhesion strength of the plating film on the flat portion of the molded article was measured by a vertical tensile test (JIS H8630). As a result, it was 8 to 12 N/cm which substantially achieved a target adhesion strength.

The respective Examples described above are given as preferable ones of the present invention. However, these Examples should not be construed as limiting the scope of the present invention in any way, and various modifications and alternations thereof are possible.

Figure 5:
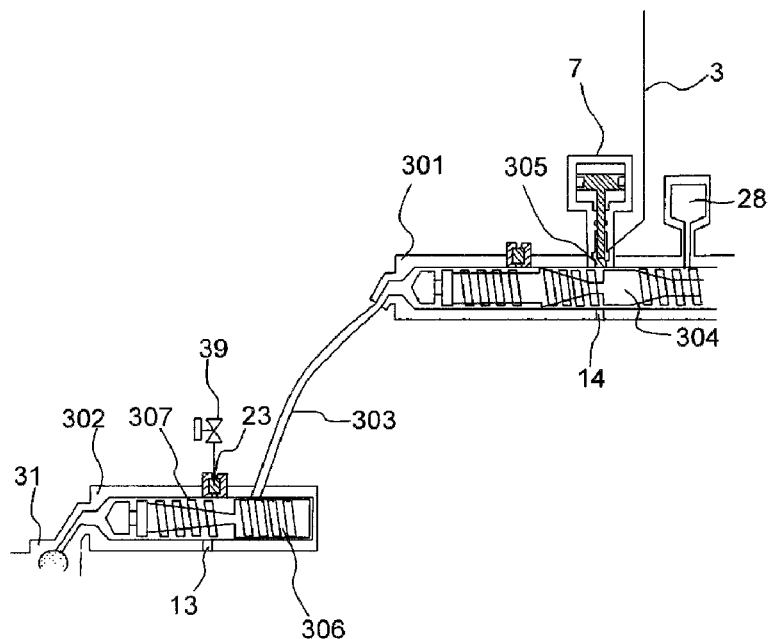
FIG. 5 shows a sectional view of a modification of the heating cylinder of the molding apparatus.

FIG. 5 shows one of the modifications of the heating cylinders 10 of the molding apparatuses shown in FIGS. 1 and 4. The heating cylinder of this modification includes a first cylinder portion 301 into which a high-pressure carbon dioxide and subject materials such as a metal complex are introduced, and a second cylinder portion 302 in which the carbon dioxide is exhausted from a molten resin. The first cylinder portion 301 is connected to the second cylinder portion 302 through the pipe 303. The screw 304 of the first cylinder portion 301 has one bent portion 305 equivalent to the first bent portion 11. The high-pressure carbon dioxide-introducing mechanism 7 is connected to a position corresponding to the bent portion 305. The screw 306 of the second cylinder portion 302 has one bent portion 307 equivalent to the second bent portion 12. The air operate valve 39 is connected to a position corresponding to the bent portion 307. As is known, the designing of the cylinder becomes simple, since the two bent portions 305 and 307 are provided on the separate cylinder portions 301 and 302, in comparison with the designing of the cylinder 10 having two bent portions 11 and 12.

Figure 6:
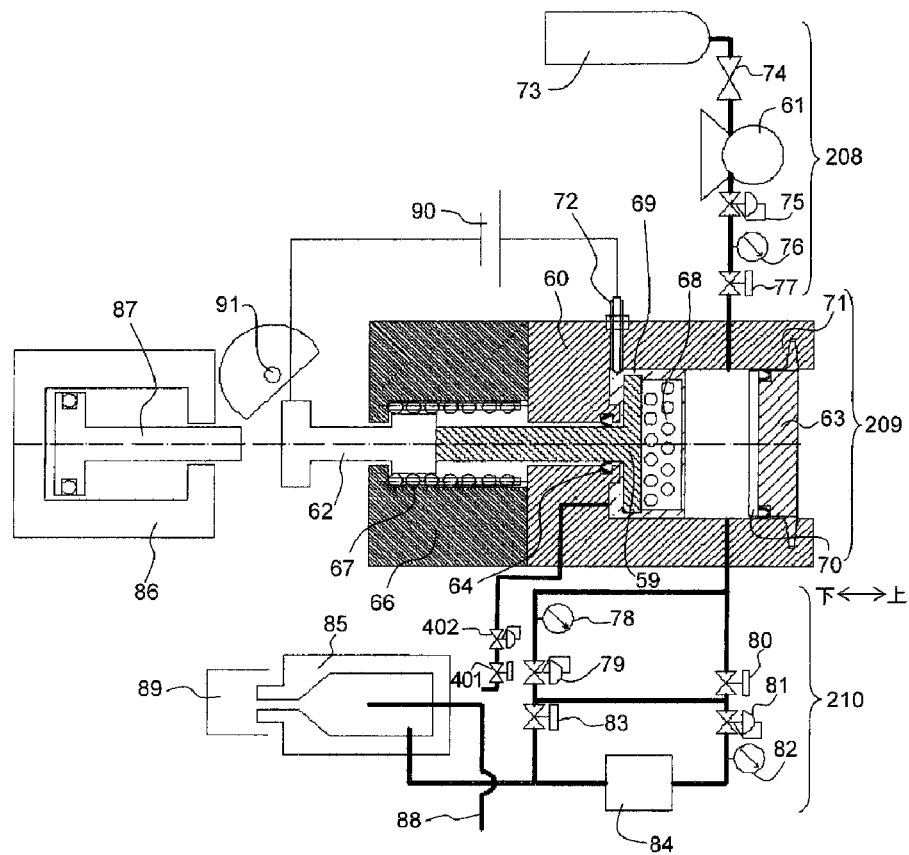
FIG. 6 shows a schematic diagram of a modification of the electroless plating apparatus.

FIG. 6 shows a modification of the electroless plating apparatus shown in FIG. 2. In an electroless plating apparatus according to this modification, the waste liquid valve 401 and the back pressure valve 402 are connected to the lower side of the high-pressure vessel 209. In this modification, after completion of a desired plating treatment, the waste liquid valve 401 is opened without lifting the plating stage 59, so that the electroless plating solution in the high-pressure plating vessel 209 is exhausted from the high-pressure plating vessel 209 through the liquid waste valve 401 and the back pressure valve 402. The electroless plating solution in the high-pressure plating vessel 209 may be drawn out, for example, in about one minute. After the exhaustion of the liquid waste, the high-pressure carbon dioxide alone is left to remain in the high-pressure plating vessel 209. In this way, the plating reaction on the molded article is completed. In this state, the automatic air operate valve 80 is opened to start the exhaustion of the high-pressure carbon dioxide. This method also makes it possible to inhibit swelling, etc. of the molded article. In this modification, the waste electroless plating solution may be recovered and recycled, or the high-pressure carbon dioxide exhausted together with the electroless plating solution from the waste liquid valve 401 may be returned to the high-pressure plating vessel 209.

In the above-described Example, the high-pressure plating vessel 209 holding the molded article and the electroless plating solution therein is sealed, and then, a high-pressure carbon dioxide is introduced into the vessel 209. Besides, for example, the high-pressure plating vessel 209 holding the molded article alone therein may be sealed, and then, a high-pressure carbon dioxide and the electroless plating solution may be introduced into the vessel 209. Further, besides, for example, after the sealing of the vessel 209, a high-pressure carbon dioxide may be introduced into the vessel 209 in advance, and then, the electroless plating solution further may be introduced together with the high-pressure carbon dioxide into the vessel 209. In the latter modification, the high-pressure carbon dioxide alone is introduced in advance, so that the surface of the molded article can be swollen before the plating treatment. Since the swollen molded article is brought into contact with the electroless plating solution, penetration of the electroless plating solution into the molded article becomes easy. Consequently, the resultant plating film can have a higher adhesion strength, as compared with the case where the surface of the molded article is not swollen.

Industrial Applicability

According to the molded article-producing method of the present invention, a high-pressure carbon dioxide is additionally supplied, while a high-pressure carbon dioxide is being exhausted from a molten resin, and therefore, the amount of a subject material to be supplied into the molten resin together with the high-pressure carbon dioxide is not limited by the solubility of the high-pressure carbon dioxide in the molten resin. Therefore, it becomes possible to supply and dissolve a desired amount of the subject material into the resin. Thus, molded articles modified to have desired properties can be commercially produced.

DESCRIPTION OF REFERENCE NUMERALS 1, 1' or 1": a syringe pump (or a flow rate-controlling means)
3: piping
6 or 6': a dissolution container
10: a plasticizing cylinder (or a cylinder)

The invention claimed is:

1. A method for producing a molded article by molding a molten resin, characterized in that said method includes the steps of
supplying a high-pressure carbon dioxide at 7 MPa or higher and a subject material dissolved therein, into said molten resin,
kneading said molten resin into which said high-pressure carbon dioxide and said subject material have been supplied, and
exhausting said high-pressure carbon dioxide from said kneaded molten resin,
said method further including the following steps before said supply of said high-pressure carbon dioxide and said subject material dissolved therein, into said molten resin;
supplying a high-pressure carbon dioxide at 7 MPa or higher having a metal complex and said subject material dissolved therein, into said molten resin, and
kneading said molten resin having said metal complex, said subject material and said high-pressure carbon dioxide supplied thereinto,
wherein, after the start of said exhaustion of said high-pressure carbon dioxide from said kneaded molten resin, said supply of said high-pressure carbon dioxide and said subject material dissolved therein, into said molten resin is started.

2. The method of claim 1, wherein said exhaustion of said high-pressure carbon dioxide from said kneaded molten resin is performed concurrently with said supply of said high-pressure carbon dioxide and said subject material dissolved therein, into said molten resin, so that said high-pressure carbon dioxide is supplied into said molten resin at a higher concentration than a saturation solubility of said high-pressure carbon dioxide in said molten resin.

3. The method of claim 1 or 2, wherein said kneading of said molten resin includes
charging said molten resin into a cylinder equipped with a screw, and kneading the molten resin by rotating the screw within the cylinder, and
rotating the screw normally and reversely, during said supply of said high-pressure carbon dioxide and said subject material dissolved therein, into said molten resin.

4. The method of claim 1, further including the following steps before said supply of said high-pressure carbon dioxide and said subject material dissolved therein, into said molten resin:
supplying a high-pressure carbon dioxide having a metal complex dissolved therein, into said molten resin, and
kneading said molten resin into which said high-pressure carbon dioxide and said metal complex have been supplied,
wherein, after the start of said exhaustion of said high-pressure carbon dioxide from said kneaded molten resin, said supply of said high-pressure carbon dioxide and said subject material dissolved therein, into said molten resin is started.

5. The method of claim 1, wherein, in the supply of said high-pressure carbon dioxide and said subject material dissolved therein, into said molten resin, said subject material is dissolved in said high-pressure carbon dioxide at a unsaturation concentration.

6. The method of claim 1, further including the steps of
molding said molten resin kneaded with said high-pressure carbon dioxide and said subject material, to form a molded article, and
subjecting said molded article to electroless plating to form a metal film on said molded article.

7. The method of claim 1, wherein the concentration of said subject material in said kneaded molten resin is increased, while the concentration of said high-pressure carbon dioxide in said molten resin is being controlled.

8. The method of claim 1, wherein said subject material is a metal alkoxide.

9. The method of claim 1, wherein said subject material is a silicone oil.

10. The method of claim 1, wherein said subject material is a fluorine compound.

11. The method of claim 4, wherein said subject material is a fluorine compound, and said metal complex is a fluorine-containing metal complex.

12. The method of claim 1, wherein said subject material is a reactive monomer, and said reactive monomer is polymerized in said kneaded molten resin to disperse the resulting polymer in said molten resin.

13. The method of claim 12, wherein said reactive monomer is ϵ-caprolactam, and said polymer is 6-Nylon.

* * * * *